United States Patent
Asakawa et al.

(10) Patent No.: US 10,523,838 B2
(45) Date of Patent: Dec. 31, 2019

(54) IMAGE SCANNING DEVICE AND IMAGE PROCESSING APPARATUS INCLUDING CARD SCANNING FUNCTION, AND IMAGE SCANNING METHOD THEREOF

(71) Applicant: Sharp Kabushiki Kaisha, Sakai, Osaka (JP)

(72) Inventors: Masaya Asakawa, Sakai (JP); Yohichi Tomota, Sakai (JP); Yuki Watanabe, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/005,788

(22) Filed: Jun. 12, 2018

(65) Prior Publication Data

US 2018/0367694 A1  Dec. 20, 2018

(30) Foreign Application Priority Data

Jun. 14, 2017  (JP) .................................. 2017-117208

(51) Int. Cl.
  *H04N 1/203* (2006.01)
  *H04N 1/00* (2006.01)

(52) U.S. Cl.
  CPC ....... *H04N 1/2038* (2013.01); *H04N 1/00376* (2013.01); *H04N 1/00408* (2013.01); *H04N 1/00702* (2013.01); *H04N 1/00761* (2013.01); *H04N 1/2032* (2013.01)

(58) Field of Classification Search
  None
  See application file for complete search history.

(56) References Cited

U.S. PATENT DOCUMENTS

| | | | | |
|---|---|---|---|---|
| 2005/0140991 A1* | 6/2005 | Ogiwara | .............. | H04N 1/3873 358/1.2 |
| 2008/0130064 A1* | 6/2008 | Sato | .................... | H04N 1/2032 358/474 |
| 2011/0063686 A1* | 3/2011 | Kimoto | ................ | H04N 1/3875 358/401 |
| 2011/0292457 A1* | 12/2011 | Miyata | ............... | H04N 1/00411 358/406 |
| 2017/0230531 A1* | 8/2017 | Takahashi | ............ | H04N 1/2338 |

FOREIGN PATENT DOCUMENTS

JP    2009-100211 A    5/2009

* cited by examiner

*Primary Examiner* — Andrew H Lam
(74) *Attorney, Agent, or Firm* — Keating & Bennett, LLP

(57) ABSTRACT

An image scanning device includes a platen, an image scanning unit that scans at a single time documents placed on the platen and generates pieces of image data, and an image data processing unit that performs processing of the pieces of image data. When the image scanning unit generates pieces of first image data by scanning first surfaces of the documents, each of which is placed in one of predetermined areas on the platen, and generates pieces of second image data by scanning surfaces opposite to the first surfaces of the documents, each of which is turned over and placed again in the one of the predetermined areas, the image data processing unit associates one of the pieces of the first image data with a corresponding one of the pieces of the second image data for each of the predetermined areas, as image data of the front and back surfaces.

14 Claims, 37 Drawing Sheets

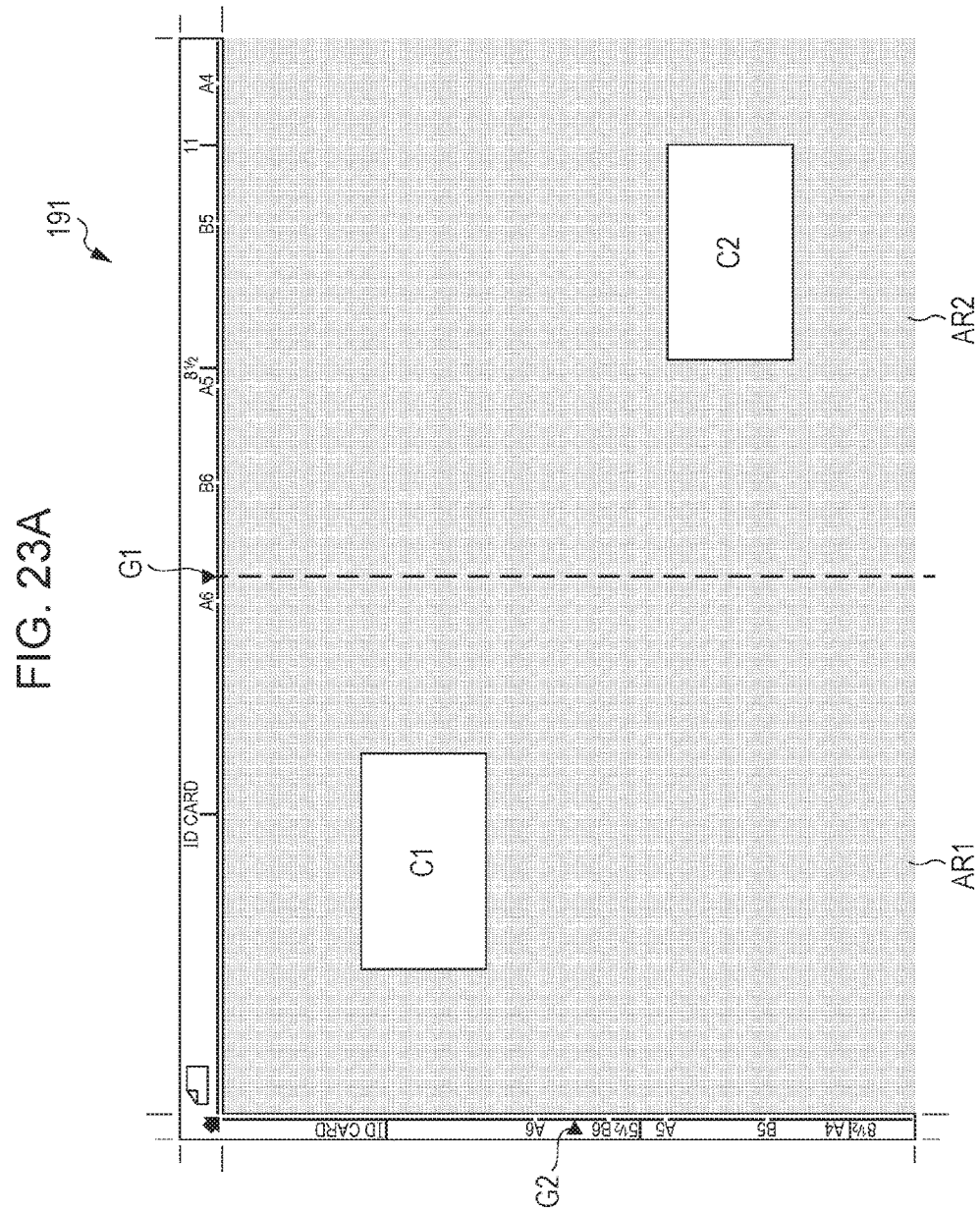

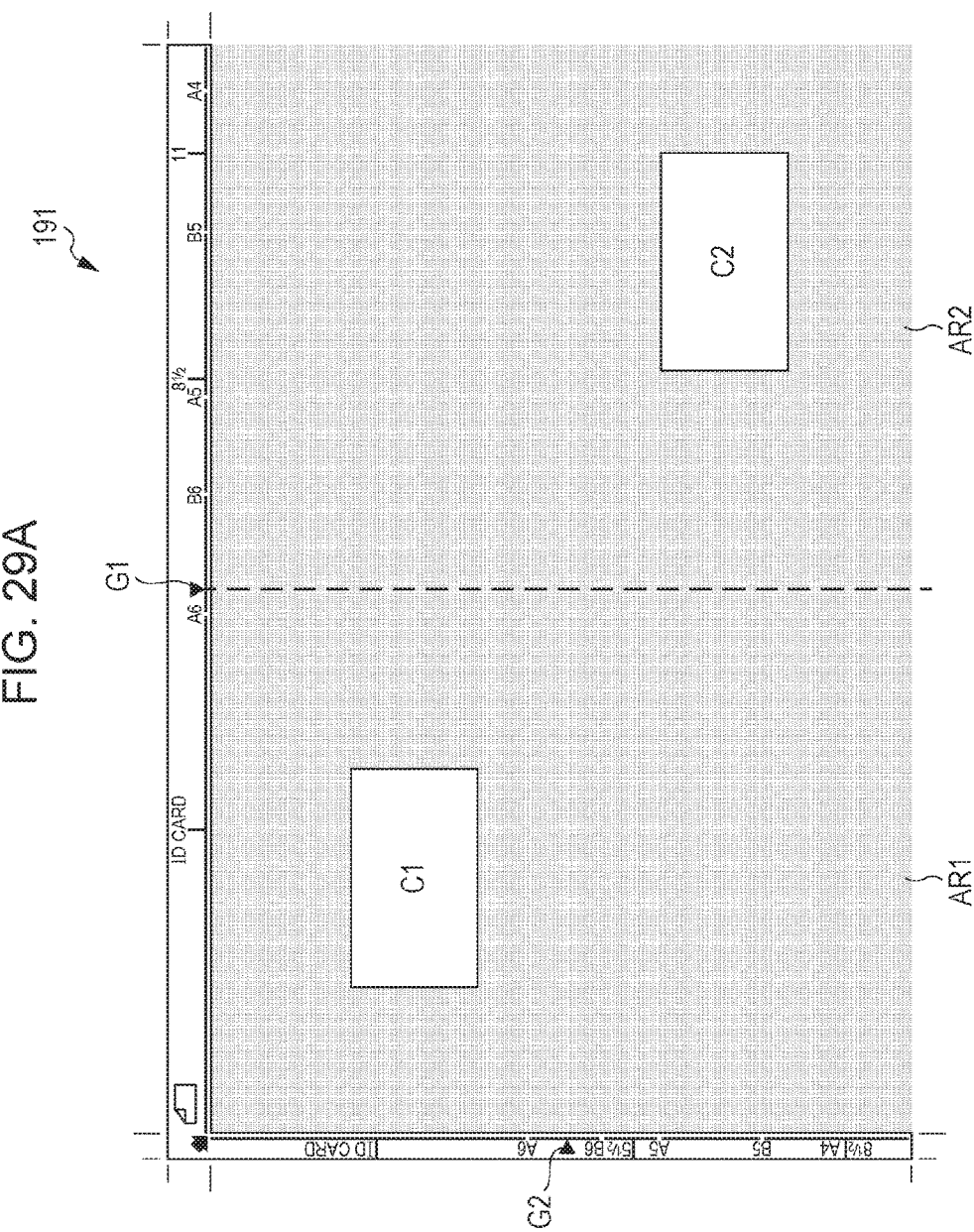

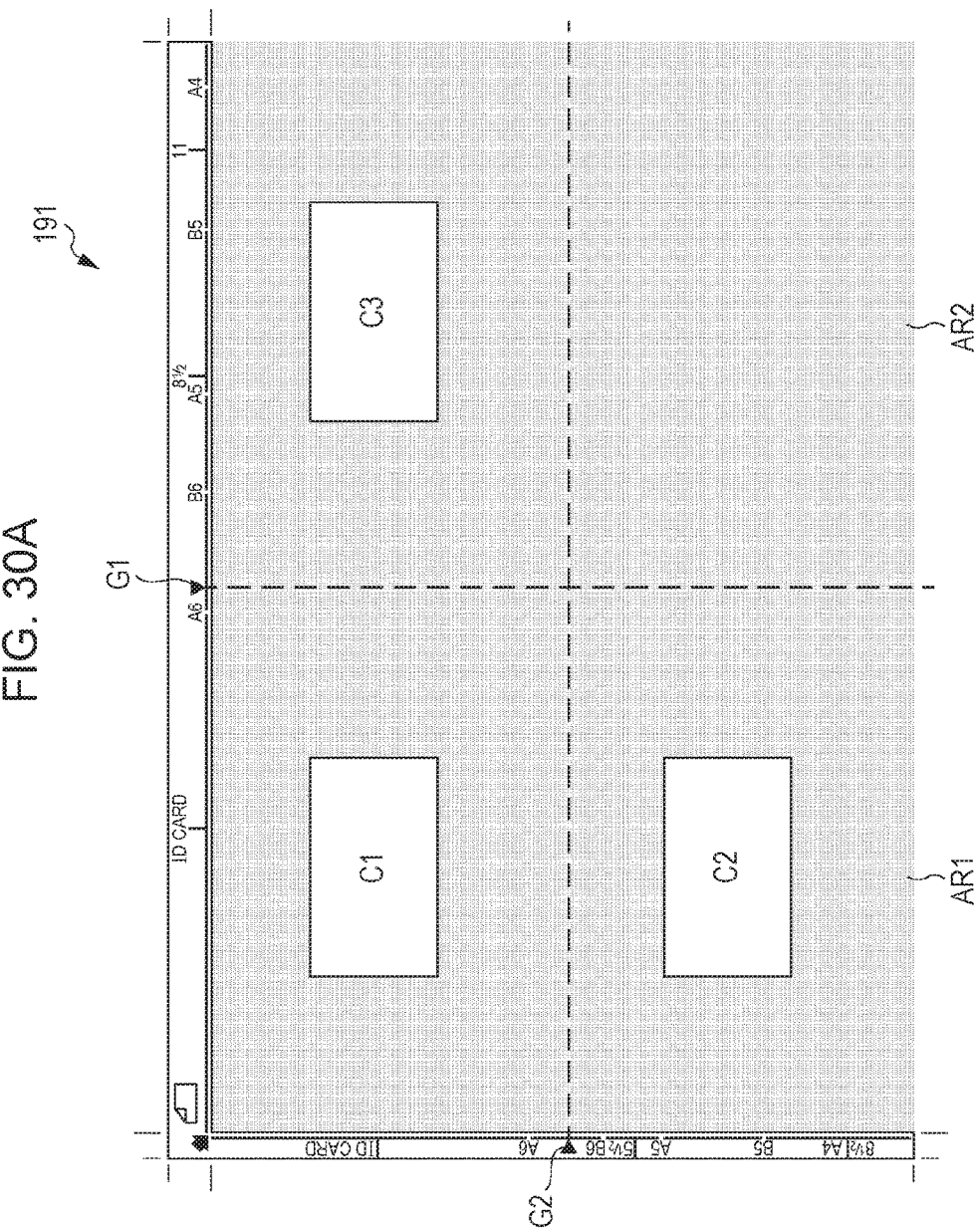

IMAGE SCANNING DEVICE AND IMAGE PROCESSING APPARATUS INCLUDING CARD SCANNING FUNCTION, AND IMAGE SCANNING METHOD THEREOF

BACKGROUND

1. Field

The present disclosure relates to an image scanning device, an image processing apparatus including the image scanning device, an image scanning method, and a non-transitory computer-readable medium.

2. Description of the Related Art

Image scanning devices having a card scan function of scanning, at a single time, images on the front and back surfaces of a card, such as a business card, a driver's license, or a credit card, are known in the related art.

Such image scanning devices having the card scan function include a device that scans both sides of a card simultaneously by using a specialized device such as an automatic double-side scanning device. However, when such an automatic double-side scanning device is used to scan a thick sheet, such as a plastic card, a dedicated path to pass a thick sheet is used, leading to a complex mechanism and an increase in device cost.

There is disclosed an image scanning device capable of associating images of the front and back surfaces of a document scanned at a single time and thereby performing processing, such as storing and displaying, of a set of images of the front and back surfaces of a document that has images on both surfaces of a sheet (for example, refer to Japanese Unexamined Patent Application Publication No. 2009-100211).

In such a card scan function, however, the size of a card to be scanned and the scan position are generally specified, and a user is requested to properly place a card of the specified size at the specified position on a platen when the card is scanned. Thus, when the user places a card of an unspecified size on the platen or a card is not placed at the specified position for scanning, an image of the card may not be properly scanned.

SUMMARY

It is desirable to provide an image scanning device capable of scanning at a single time a plurality of documents placed on a platen with less restriction than in the related art, an image processing apparatus including the image scanning device, an image scanning method, and a non-transitory computer-readable medium.

According to an aspect of the disclosure, there is provided an image scanning device including a platen, an image scanning unit that scans at a single time a plurality of documents placed on the platen and generates a plurality of pieces of image data, and an image data processing unit that performs processing of the plurality of pieces of image data. When the image scanning unit generates a plurality of pieces of first image data by scanning at a single time first surfaces of the plurality of documents, each of the plurality of documents being placed in one of a plurality of predetermined areas on the platen, and thereafter generates a plurality of pieces of second image data by scanning at a single time surfaces opposite to the first surfaces of the plurality of documents, each of the plurality of documents being turned over and placed again in the one of the plurality of predetermined areas, the image data processing unit associates one of the plurality of pieces of the first image data with a corresponding one of the plurality of pieces of the second image data for each of the plurality of predetermined areas, as pieces of image data of the front surface and the back surface.

According to another aspect of the disclosure, there is provided an image processing apparatus including the image scanning device, a display unit, and an image processing unit that performs processing of image data generated by the image scanning device and that thereafter causes the display unit to display an image based on the image data.

According to still another aspect of the disclosure, there is provided an image scanning method including image scanning in which a plurality of documents placed on a platen are scanned at a single time and a plurality of pieces of image data are generated, and image data processing in which the plurality of pieces of image data are processed. In the image scanning, when a plurality of pieces of first image data are generated by scanning at a single time first surfaces of the plurality of documents, each of the plurality of documents being placed in one of a plurality of predetermined areas on the platen, and thereafter a plurality of pieces of second image data are generated by scanning at a single time surfaces opposite to the first surfaces of the plurality of documents, each of the plurality of documents being turned over and placed again in the one of the plurality of predetermined areas, in the image data processing, one of the plurality of pieces of the first image data is associated with a corresponding one of the plurality of pieces of the second image data for each of the plurality of predetermined areas, as pieces of image data of the front surface and the back surface.

According to a further aspect of the disclosure, there is provided a non-transitory computer-readable medium storing a program causing a processor of an image scanning device to execute a process including image scanning in which a plurality of documents placed on a platen are scanned at a single time and a plurality of pieces of image data are generated, and image data processing in which the plurality of pieces of image data are processed. In the image scanning, when a plurality of pieces of first image data are generated by scanning at a single time first surfaces of the plurality of documents, each of the plurality of documents being placed in one of a plurality of predetermined areas on the platen, and thereafter a plurality of pieces of second image data are generated by scanning at a single time surfaces opposite to the first surfaces of the plurality of documents, each of the plurality of documents being turned over and placed again in the one of the plurality of predetermined areas, in the image data processing, one of the plurality of pieces of the first image data is associated with a corresponding one of the plurality of pieces of the second image data for each of the plurality of predetermined areas, as pieces of image data of the front surface and the back surface.

BRIEF DESCRIPTION OF THE DRAWINGS

FIGS. 23A and 23B are illustrations depicting examples of card layout on the platen in FIG. 4;

FIG. 23A depicts an example layout for scanning the back surfaces of the cards, and FIG. 23B depicts an example layout for scanning the front surfaces of the cards;

FIG. 24A depicts an example layout for transmission to a sheet in portrait orientation, and FIG. 24B depicts an example layout for transmission to a sheet in landscape orientation;

FIGS. 25A and 25B each depict an example layout for transmission to a sheet in portrait orientation, and FIGS. 25C and 25D each depict an example layout for transmission to a sheet in landscape orientation;

FIGS. 26A and 26B each depict an example layout for transmission to sheets in portrait orientation, and FIGS. 26C and 26D each depict an example layout for transmission to sheets in landscape orientation;

FIGS. 27A and 27B each depict an example layout for transmission to a sheet in portrait orientation;

FIG. 28A depicts an example layout for scanning the back surfaces of the cards, and FIG. 28B depicts an example layout for scanning the front surface of the card;

FIGS. 29A and 29B are illustrations depicting examples of improper card layout;

FIG. 29A depicts an example layout for scanning the back surfaces of the cards, and FIG. 29B depicts an example layout for scanning the front surfaces of the cards;

FIGS. 30A and 30B are illustrations depicting examples of improper card layout;

FIG. 30A depicts an example layout for scanning the back surfaces of the cards, and FIG. 30B depicts an example layout for scanning the front surfaces of the cards;

FIG. 31A depicts an example layout for scanning the back surfaces of the cards, and FIG. 31B depicts an example layout for scanning the front surfaces of the cards;

FIG. 32A depicts an example layout for scanning the back surfaces of the cards, and FIG. 32B depicts an example layout for scanning the front surfaces of the cards.

Figure 1:
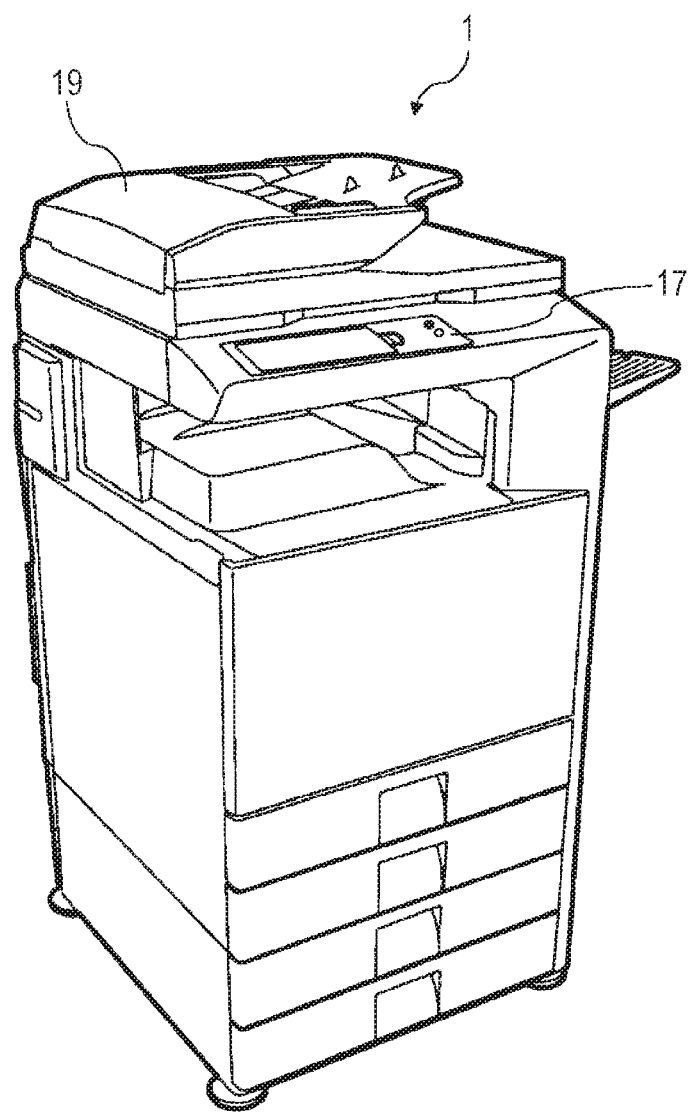
FIG. 1 is a perspective view of the exterior of a digital multifunction peripheral according to embodiments of the present disclosure.

DESCRIPTION OF THE EMBODIMENTS (i) An image scanning device according to this disclosure includes a platen, an image scanning unit that scans at a single time a plurality of documents placed on the platen and generates a plurality of pieces of image data, and an image data processing unit that performs processing of the plurality of pieces of image data. When the image scanning unit generates a plurality of pieces of first image data by scanning at a single time first surfaces of the plurality of documents, each of the plurality of documents being placed in one of a plurality of predetermined areas on the platen, and thereafter generates a plurality of pieces of second image data by scanning at a single time surfaces opposite to the first surfaces of the plurality of documents, each of the plurality of documents being turned over and placed again in the one of the plurality of predetermined areas, the image data processing unit associates one of the plurality of pieces of the first image data with a corresponding one of the plurality of pieces of the second image data for each of the plurality of predetermined areas, as pieces of image data of the front surface and the back surface.

An image processing apparatus according to this disclosure includes the image scanning device, a display unit, and an image processing unit that performs processing of image data generated by the image scanning device and that thereafter causes the display unit to display an image based on the image data.

An image scanning method according to this disclosure includes image scanning in which a plurality of documents placed on a platen are scanned at a single time and a plurality of pieces of image data are generated and image data processing in which the plurality of pieces of image data are processed. In the image scanning, when a plurality of pieces of first image data are generated by scanning at a single time first surfaces of the plurality of documents, each of the plurality of documents being placed in one of a plurality of predetermined areas on the platen, and thereafter a plurality of pieces of second image data are generated by scanning at a single time surfaces opposite to the first surfaces of the plurality of documents, each of the plurality of documents being turned over and placed again in the one of the plurality of predetermined areas, in the image data processing, one of the plurality of pieces of the first image data is associated with a corresponding one of the plurality of pieces of the second image data for each of the plurality of predetermined areas, as pieces of image data of the front surface and the back surface.

A non-transitory computer-readable medium according to this disclosure stores a program causing a processor of an image scanning device to execute a process including image scanning in which a plurality of documents placed on a platen are scanned at a single time and a plurality of pieces of image data are generated and image data processing in which the plurality of pieces of image data are processed. In the image scanning, when a plurality of pieces of first image data are generated by scanning at a single time first surfaces of the plurality of documents, each of the plurality of documents being placed in one of a plurality of predetermined areas on the platen, and thereafter a plurality of pieces of second image data are generated by scanning at a single time surfaces opposite to the first surfaces of the plurality of documents, each of the plurality of documents being turned over and placed again in the one of the plurality of predetermined areas, in the image data processing, one of the plurality of pieces of the first image data is associated with a corresponding one of the plurality of pieces of the second image data for each of the plurality of predetermined areas, as pieces of image data of the front surface and the back surface.

In this disclosure, the phrase "a plurality of documents, each of the plurality of documents being placed in one of a plurality of predetermined areas" includes not only a plurality of documents that occupy all of the plurality of predetermined areas, but also a plurality of documents that occupy some of the plurality of predetermined areas. For example, the phrase "a plurality of documents, each of the plurality of documents being placed in one of a plurality of predetermined areas" may mean documents placed in one to three areas among four areas created by dividing a platen lengthwise and breadthwise.

Embodiments of the present disclosure will be described further.

(ii) The image scanning device according to this disclosure may further include an area indicating unit having at least one mark that indicates positions of the plurality of predetermined areas.

In this way, a plurality of documents are placed by using, as a guide, the area indicating unit that indicates the positions of the plurality of predetermined areas, and thus the image scanning device capable of scanning at a single time a plurality of documents that are placed on the platen with less restriction than in the related art may be realized.

The phrase "an area indicating unit having at least one mark that indicates positions of the plurality of predetermined areas" means, for example, a perimeter (document guide) of the platen on which at least one mark that indicates a position of a boundary between areas, such as a triangular arrowhead, an indicating line, or a boundary line, is present. Alternatively, the area indicating unit may be a platen cover on which an arrow or an indicating line is drawn to indicate a plurality of areas at a position corresponding to the at least one mark on the platen. The area indicating unit may also be a laser, which emits a directional light indicating a position of a boundary between a plurality of areas.

(iii) The image scanning device according to this disclosure may further include an output layout setting unit that sets a layout for outputting the plurality of pieces of image data, and the image data processing unit may associate the plurality of pieces of image data with each other in accordance with the layout that is set by the output layout setting unit.

In this way, the plurality of pieces of image data are associated with each other in accordance with the layout that is set by the output layout setting unit, and thus the image scanning device capable of scanning at a single time a plurality of documents that are placed on the platen with less restriction than in the related art may be realized.

(iv) The image scanning device according to this disclosure may further include a display unit, the display unit indicating positions of the plurality of areas on the platen, the plurality of areas being predetermined in accordance with the number of the plurality of documents to be scanned at a single time, so that each of the plurality of documents is placed separately in one of the plurality of areas.

In this way, the plurality of areas that are predetermined in accordance with the number of the plurality of documents to be scanned at a single time are displayed by the display unit, and thus the image scanning device capable of scanning at a single time a plurality of documents that are placed on the platen with less restriction than in the related art may be realized.

(v) In the image scanning device according to this disclosure, the at least one mark may be a boundary line that divides the platen into the plurality of areas in accordance with the number of the plurality of documents to be scanned at a single time.

In this way, at least one boundary line that divides the platen into the plurality of areas is displayed by the display unit in accordance with the number of the plurality of documents to be scanned at a single time, and thus the user may easily place both surfaces of one of the plurality of documents in the same area using the at least one boundary line as a guide.

The plurality of areas may be indicated by using a graphic symbol other than a boundary line, and another symbol such as an arrow may be used.

(vi) In the image scanning device according to this disclosure, the at least one mark may be an arrow, an indicating line, or another indicating symbol that indicates a position of a boundary between the plurality of areas in accordance with the number of the plurality of documents to be scanned at a single time.

In this way, at least one indicating symbol, such as an arrow, an indicating line, or the like that indicates a position of a boundary between the plurality of areas is displayed by the display unit in accordance with the number of the plurality of documents to be scanned at a single time, and thus the user may easily place both surfaces of one of the plurality of documents in the same area on the platen using the at least one indicating symbol as a guide.

(vii) In the image scanning device according to this disclosure, the image scanning unit may generate the plurality of pieces of the first image data, and thereafter the display unit may display a scan result of the plurality of pieces of the first image data.

In this way, a result of scanning first surfaces of the plurality of documents at a single time is displayed, and thus the user may easily turn over and place each of the plurality of documents in a corresponding area on the platen using the result as a guide.

(viii) In the image scanning device according to this disclosure, the image scanning unit may generate the plurality of pieces of the first image data, and thereafter the display unit displays an instruction to turn over and place each of the plurality of documents again in a corresponding one of the plurality of areas.

In this way, the instruction to turn over and place each of the plurality of documents again in the corresponding one of the plurality of predetermined areas is displayed by the display unit after the surfaces of the plurality of documents are scanned at a single time, and thus the user may easily turn over and place each of the plurality of documents in the corresponding area on the platen using the instruction as a guide.

(ix) In the image scanning device according to this disclosure, the instruction may include at least one of an animation and a message.

In this way, the animation or message to turn over and place each of the plurality of documents again in the corresponding one of the plurality of predetermined areas is displayed by the display unit after the surfaces of the plurality of document are scanned at a single time, and thus the user may easily turn over and place each of the plurality of documents in the corresponding area on the platen using the animation or message as a guide.

(x) The image scanning device according to this disclosure may further include an operation unit that receives an instruction from the user, when the image scanning unit generates the plurality of pieces of the first image data and the plurality of pieces of the second image data, the display unit may display, in accordance with the number of the plurality of documents, a plurality of layouts in which the plurality of documents are arranged in rows and columns in accordance with predetermined arrays, and, when the operation unit receives selection of one of the plurality of layouts, the output layout setting unit may associate each of the plurality of pieces of the first image data with one of the plurality of pieces of the second image data in accordance with the selected one of the plurality of layouts.

In this way, each of the plurality of pieces of the first image data is associated with one of the plurality of pieces of the second image data in accordance with the layout selected by the user from the plurality of layouts displayed by the display unit in accordance with the number of the plurality of documents, and thus an image scanning device that enables the user to select various layouts easily and that is capable of outputting the images of the plurality of documents may be realized.

(xi) The image scanning device according to this disclosure may further include an image scanning determining unit and an error reporting unit, and when the image scanning determining unit determines that the plurality of documents are improperly arranged in the plurality of areas, the error reporting unit may report error information.

In this way, when the plurality of documents are improperly arranged in the plurality of predetermined areas, the error information is reported, and thus the image scanning device capable of scanning at a single time a plurality of documents that are placed on the platen with less restriction than in the related art may be realized.

Hereinafter, the present disclosure will be described in more detail with reference to the drawings. The following descriptions are illustrative in all respects and are not to be considered as limiting this disclosure.

First Embodiment

Figure 2:
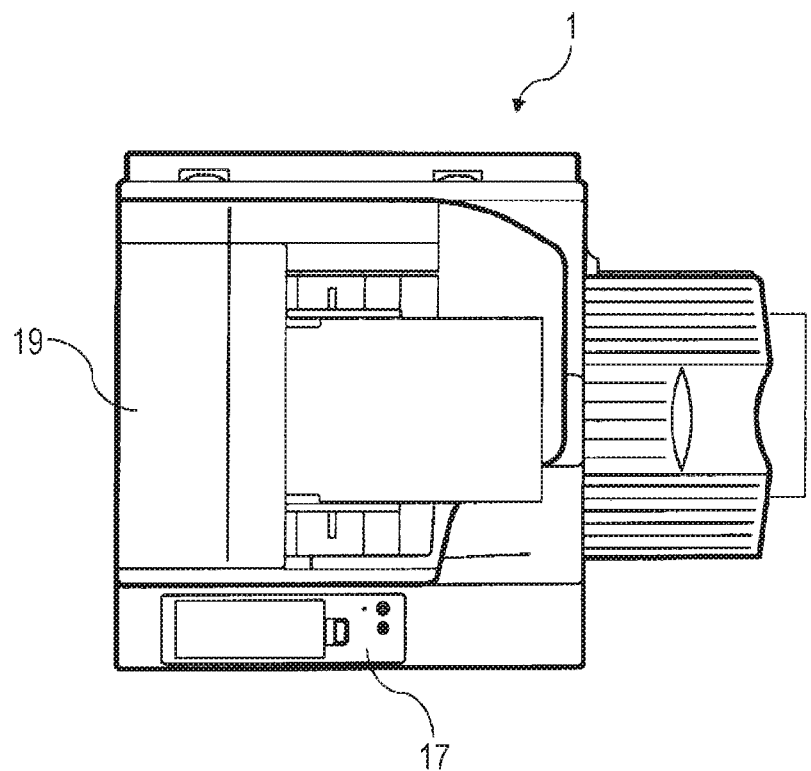
FIG. 2 is a plan view of the digital multifunction peripheral in FIG. 1.
Figure 3:
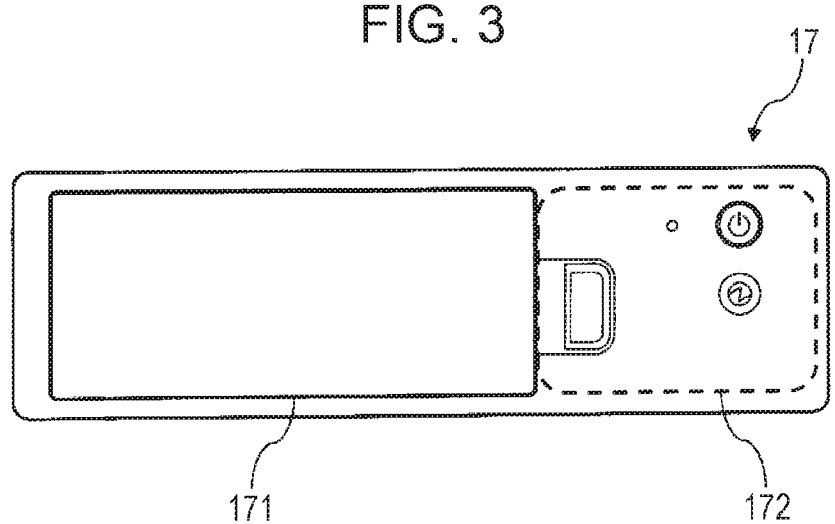
FIG. 3 is an illustration depicting a panel unit of the digital multifunction peripheral in FIG. 1.
Figure 4:
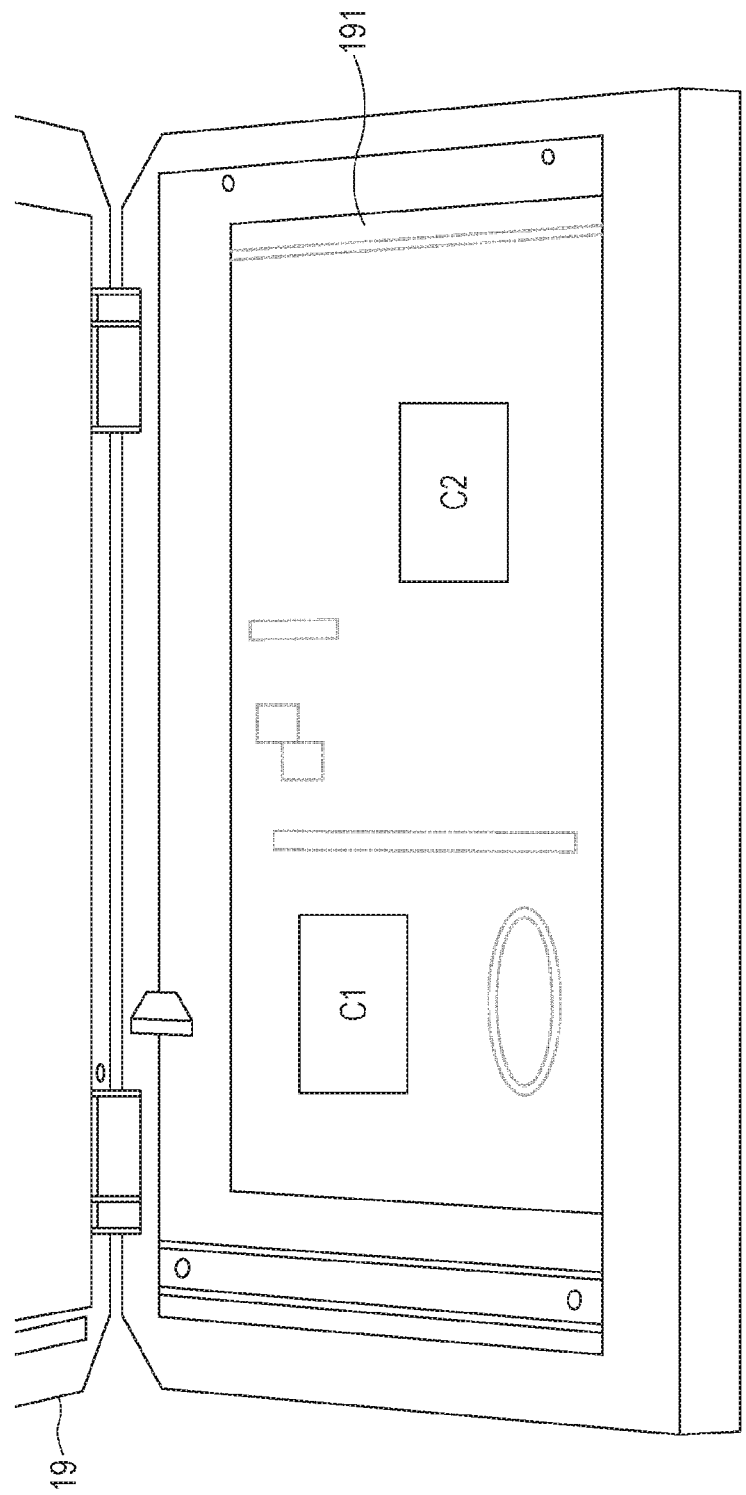
FIG. 4 is an illustration depicting a platen when a platen cover of the digital multifunction peripheral in FIG. 1 is opened.
Figure 5:
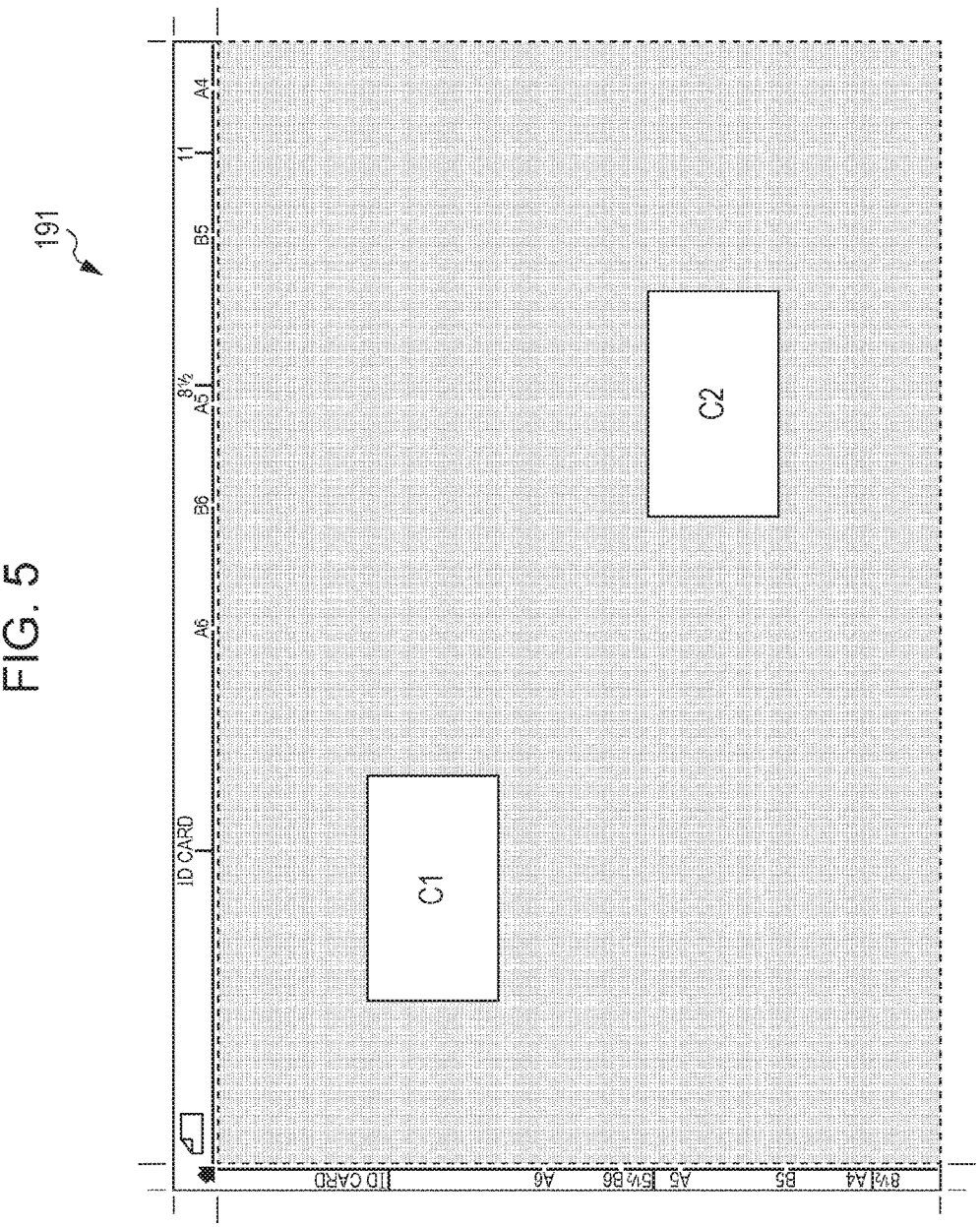
FIG. 5 is an illustration depicting the platen in FIG. 4.

Referring to FIGS. 1 to 5, an outline of a digital multifunction peripheral 1 will be described as an example image processing apparatus including the image scanning device according to an embodiment of the present disclosure. FIG. 1 is a perspective view of the exterior of the digital multifunction peripheral 1 according to the embodiment of the present disclosure. FIG. 2 is a plan view of the digital multifunction peripheral 1 in FIG. 1. FIG. 3 is an illustration depicting a panel unit 17 of the digital multifunction peripheral 1 in FIG. 1. FIG. 4 is an illustration depicting a platen 191 when a platen cover 19 of the digital multifunction peripheral 1 in FIG. 1 is opened. FIG. 5 is an illustration depicting the platen 191 in FIG. 4.

The digital multifunction peripheral 1 is an apparatus that has a copying function, a scanning function, and a facsimile function, performs digital processing of image data obtained by scanning a document, and thereafter outputs the processed image data.

This disclosure is applicable not only to the digital multifunction peripheral 1 but also to all apparatuses having an image scanning function, such as a scanner and a passport reader.

As depicted in FIGS. 1, 2, and 4, the digital multifunction peripheral 1 includes the platen cover 19 covering the platen 191 and the panel unit 17. As depicted in FIG. 3, the panel unit 17 includes a display operation unit 171 having a touch panel function and a physical operation unit 172.

As depicted in FIGS. 4 and 5, a user opens the platen cover 19 upward, places a plurality of cards C1 and C2 on the platen 191, and scans the plurality of cards at a single time.

The digital multifunction peripheral 1 performs a job such as a card scan in accordance with an instruction received from the user via the display operation unit 171.

Figure 6:
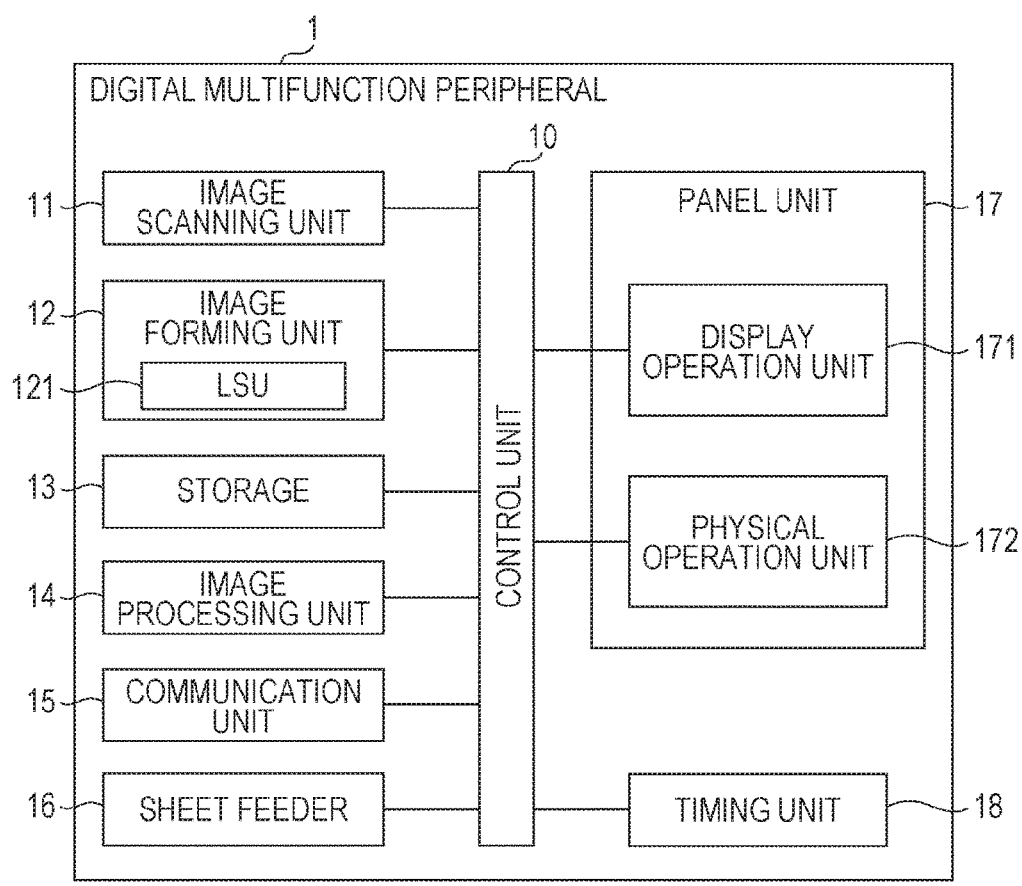
FIG. 6 is a block diagram depicting a schematic configuration of the digital multifunction peripheral in FIG. 1.

Next, referring to FIG. 6, a schematic configuration of the digital multifunction peripheral 1 will be described. FIG. 6 is a block diagram depicting a schematic configuration of the digital multifunction peripheral 1 in FIG. 1. As depicted in FIG. 6, the digital multifunction peripheral 1 includes a control unit 10, an image scanning unit 11, an image forming unit 12, a storage 13, an image processing unit 14, a communication unit 15, a sheet feeder 16, the panel unit 17, and a timing unit 18. Each unit of the digital multifunction peripheral 1 will be described below.

The control unit 10 controls the digital multifunction peripheral 1 in a coordinated manner and includes a central processing unit (CPU), a random-access memory (RAM), a read-only memory (ROM), various interface circuits, and the like. The control unit 10 detects signals from all sensors and performs monitoring and control of all loads placed on motors, clutches, the panel unit 17, and the like to control operation of the digital multifunction peripheral 1 as a whole.

The image scanning unit 11 is a unit that detects and scans a document, such as a card, placed on the platen 191 or a document transported from a document tray and that generates image data.

The image forming unit 12, which includes a laser scanning unit (LSU) 121, is a unit that prints on a sheet an image based on image data generated by the image processing unit 14. The LSU 121 is a device that forms an electrostatic latent image by irradiating a surface of a charged photosensitive drum with laser light corresponding to image information composed of digital signals acquired by the image scanning unit 11.

The storage 13 is a device or a recording medium that stores information, control programs, and the like that are used to realize various functions of the digital multifunction peripheral 1. A semiconductor device such as a RAM or a ROM, or a recording medium such as a hard disk drive, a flash memory unit, or a solid-state drive (SSD) is used for the storage 13. Programs and data may be retained separately in different devices. For example, a data-retaining region may be a hard disk drive, and a program-retaining region may be a flash memory unit.

The image processing unit 14 is a unit that converts an image of a document scanned by the image scanning unit 11 into proper electric signals and that generates image data. In addition, in accordance with an instruction received via the display operation unit 171, the image processing unit 14 performs processing of image data received from the image scanning unit 11 so that output data satisfies the instruction, for example, to enlarge or reduce the image. The image processing unit 14 also associates a plurality of pieces of image data with each other in accordance with a predetermined layout.

The communication unit 15 is a unit that communicates with a computer, a mobile information terminal, an external information processing apparatus, a facsimile device, or the like via a network or the like. Information of various kinds, such as emails or facsimile messages, is transmitted to or received from such external communication apparatuses via the communication unit 15.

The sheet feeder 16 is a unit that transports sheets housed in a sheet feed cassette or a manual feed tray to the image forming unit 12.

The panel unit 17, which is a unit equipped with a liquid crystal display, includes the display operation unit 171 and the physical operation unit 172.

The display operation unit 171 is a unit that displays information of various kinds and that receives an instruction from a user via a touch panel function. The display operation unit 171 is constituted by, for example, a cathode-ray tube (CRT) display, a liquid crystal display, or an electroluminescent (EL) display and is a display device, such as a monitor or a line display, that enables the operating system or application software to display information based on electronic data, such as processing status. The control unit 10 causes the display operation unit 171 to display operation status and condition of the digital multifunction peripheral 1.

Outline of Card Scan Processing

Figure 7:
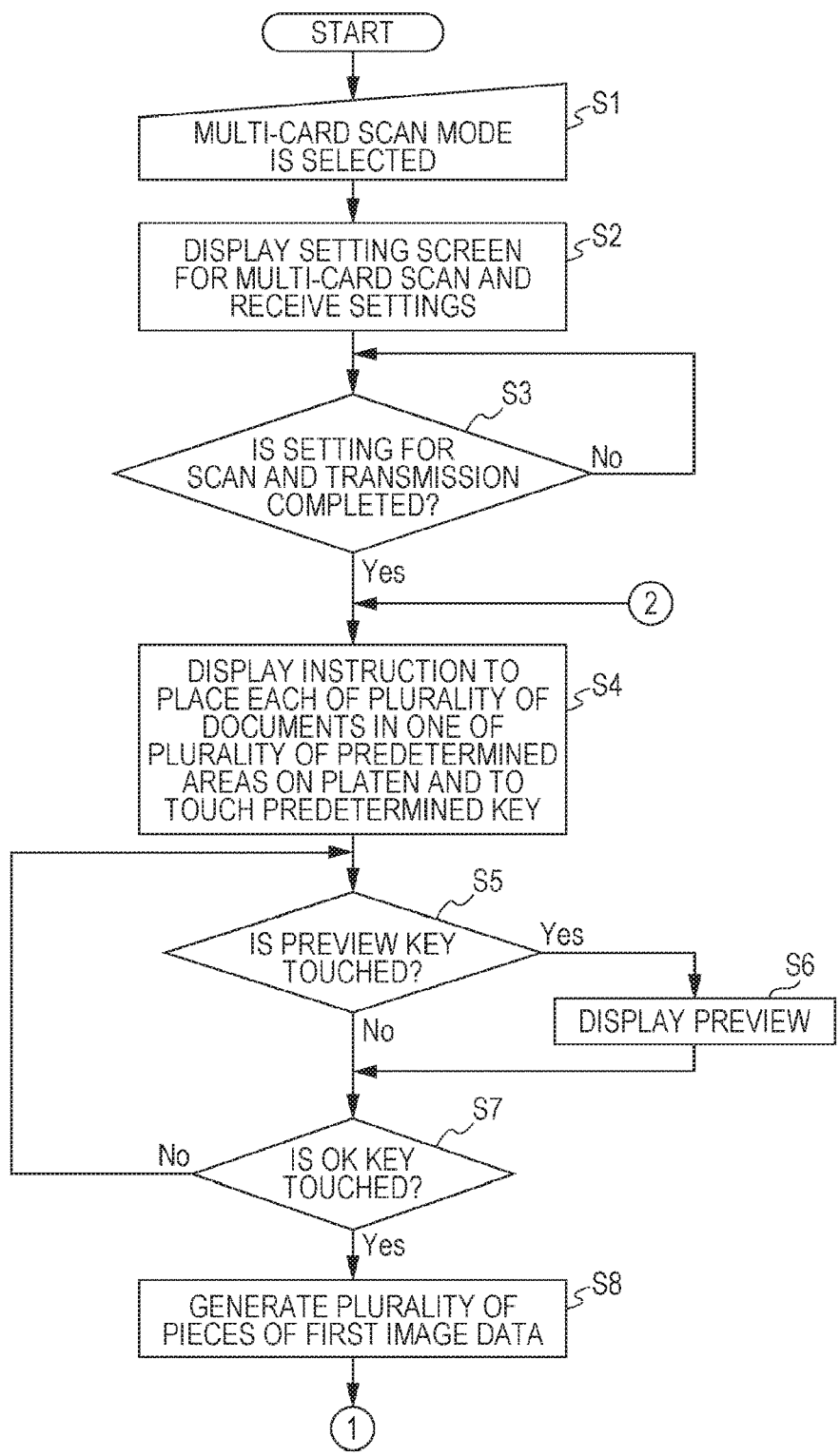
FIG. 7 is a flowchart illustrating an outline of card scan processing performed by the digital multifunction peripheral in FIG. 1.
Figure 8:
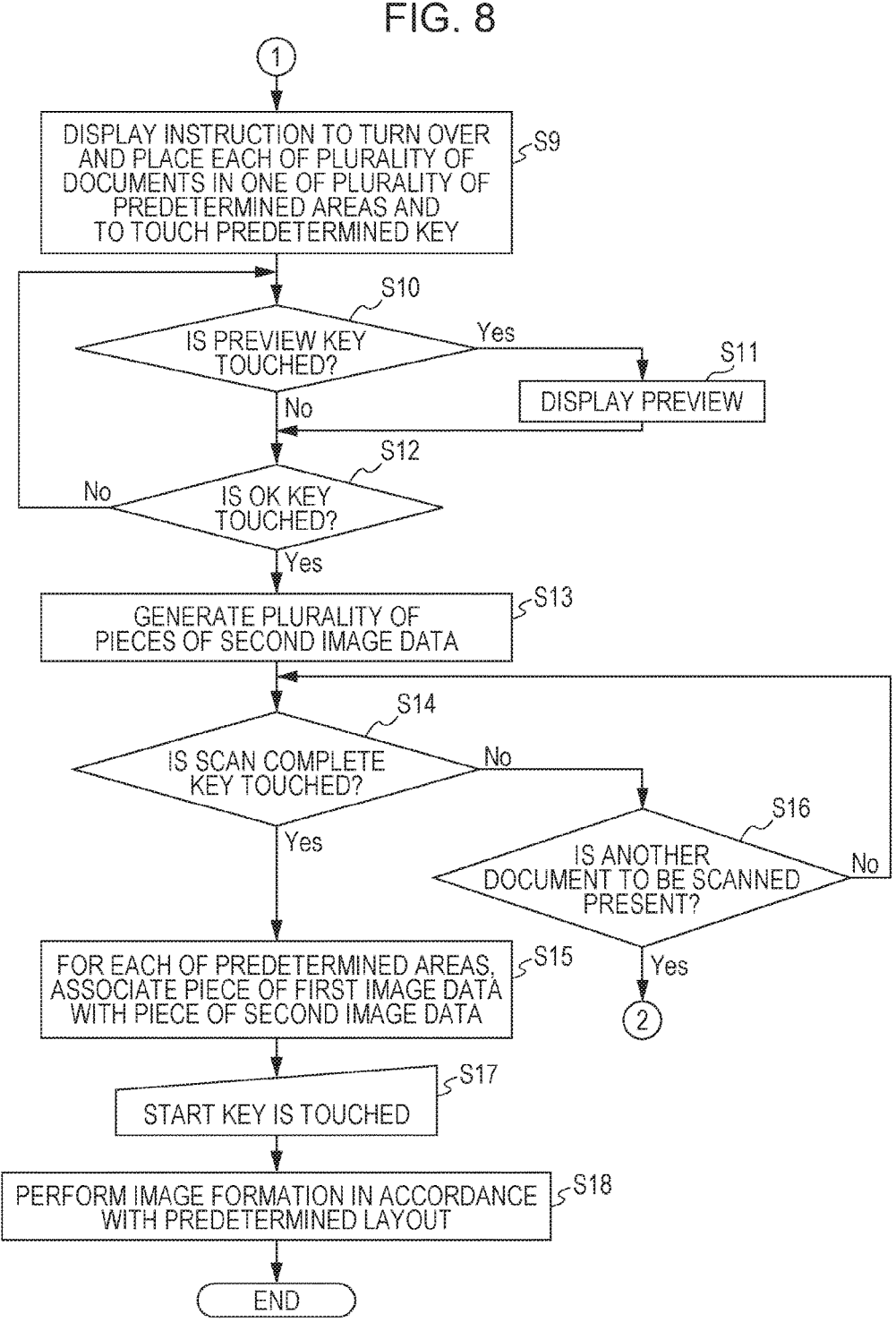
FIG. 8 is a flowchart illustrating the outline of card scan processing performed by the digital multifunction peripheral in FIG. 1.

Next, referring to FIGS. 7 and 8, an outline of card scan processing performed by the digital multifunction peripheral 1 according to a first embodiment of the present disclosure will be described. FIGS. 7 and 8 constitute a flowchart illustrating the outline of card scan processing performed by the digital multifunction peripheral 1 in FIG. 1.

In the following, a multi-card scan mode will be described. A multi-card scan mode is defined as a mode in which images on the front and back surfaces of a plurality of cards placed on the platen 191 are scanned and a plurality of pieces of image data are generated.

When a user selects the multi-card scan mode in step S1 in FIG. 7 (step S1), the control unit 10 causes the display operation unit 171 to display a setting screen for the multi-card scan and receives settings in step S2, which follows step S1 (step S2). Specifically, the control unit 10 causes the display operation unit 171 to display a setting screen for a card scan and transmission (output) and enables the user to input settings.

Subsequently, in step S3, the control unit 10 determines whether the setting input for the card scan and the transmission is completed. When the setting input for the card scan and the transmission is completed (Yes in step S3), the control unit 10 performs processing in step S4 (step S4). In contrast, when the setting input for the card scan and the transmission is not completed (No in step S3), the control unit 10 repeats the determination processing in step S3 (step S3).

Then, in step S4, the control unit 10 causes the display operation unit 171 to display an instruction to place a plurality of documents, each of which is to be placed in one of a plurality of predetermined areas on the platen 191, and to touch a predetermined key such as a preview key or an OK key thereafter (step S4).

Next, in step S5, the control unit 10 determines whether the preview key is touched (step S5). When the preview key is touched (Yes in step S5), in step S6, the control unit 10 causes the display operation unit 171 to display a preview screen of the image data of the cards placed on the platen 191 (step S6). Subsequently, the control unit 10 performs determination processing in step S7 (step S7).

In contrast, when the preview key is not touched (No in step S5), the control unit 10 performs determination processing in step S7 (step S7).

In step S7, the control unit 10 determines whether the OK key is touched (step S7). When the OK key is touched (Yes in step S7), in step S8, the control unit 10 generates a plurality of pieces of image data (first image data), each of the plurality of pieces corresponding to a first surface of one of the plurality of documents that are placed separately in the plurality of areas (step S8). Subsequently, the control unit 10 performs processing in step S9 in FIG. 8 (step S9).

In contrast, when the OK key is not touched (No in step S7), the control unit 10 repeats determination processing in step S5 (step S5).

Then, in step S9 in FIG. 8, the control unit 10 causes the display operation unit 171 to display an instruction to turn over and place each of the plurality of documents in one of the plurality of areas on the platen 191 and to touch a predetermined key such as the preview key or the OK key thereafter (step S9).

Subsequently, in step S10, the control unit 10 determines whether the preview key is touched (step S10). When the preview key is touched (Yes in step S10), in step S11, the control unit 10 causes the display operation unit 171 to display a preview screen of the image data of the cards placed on the platen 191 (step S11). Then, the control unit 10 performs determination processing in step S12 (step S12).

In contrast, when the preview key is not touched in step S10 (No in step S10), the control unit 10 performs determination processing in step S12 (step S12).

In step S12, the control unit 10 determines whether the OK key is touched (step S12). When the OK key is touched (Yes in step S12), in step S13, the control unit 10 generates a plurality of pieces of image data (second image data), each of the plurality of pieces corresponding to the opposite surface of one of the plurality of documents that are placed separately in the plurality of areas (step S13). Then, the control unit 10 performs determination processing in step S14 in FIG. 8 (step S14).

In contrast, when the OK key is not touched (No in step S12), the control unit 10 repeats determination processing in step S10 (step S10).

In step S14, the control unit 10 determines whether a scan complete key is touched (step S14). When the scan complete key is touched (Yes in step S14), in step S15, for each of the plurality of areas on the platen 191, the control unit 10 associates a piece of the first image data with a piece of the second image data, both of which are obtained by scanning the platen 191 (step S15). Then, the control unit 10 waits for processing in step S17 to finish (step S17).

In contrast, when the scan complete key is not touched in step S14 (No in step S14), in step S16, the control unit 10 causes the display operation unit 171 to display an instruction to check whether another document to be scanned is present (step S16). When another document to be scanned is present (Yes in step S16), the control unit 10 repeats the processing in step S4 in FIG. 7 (step S4). In contrast, no other document to be scanned is present (No in step S16), the control unit 10 repeats the determination processing in step S14 (step S14).

Then, when a start key is touched in step S17, in step S18, the control unit 10 causes the image processing unit 14 to process the scanned image data in accordance with the layout set by the user and causes the image forming unit 12 to perform image formation (step S18).

Example of Operating Procedure for Card Scan

Figure 15:
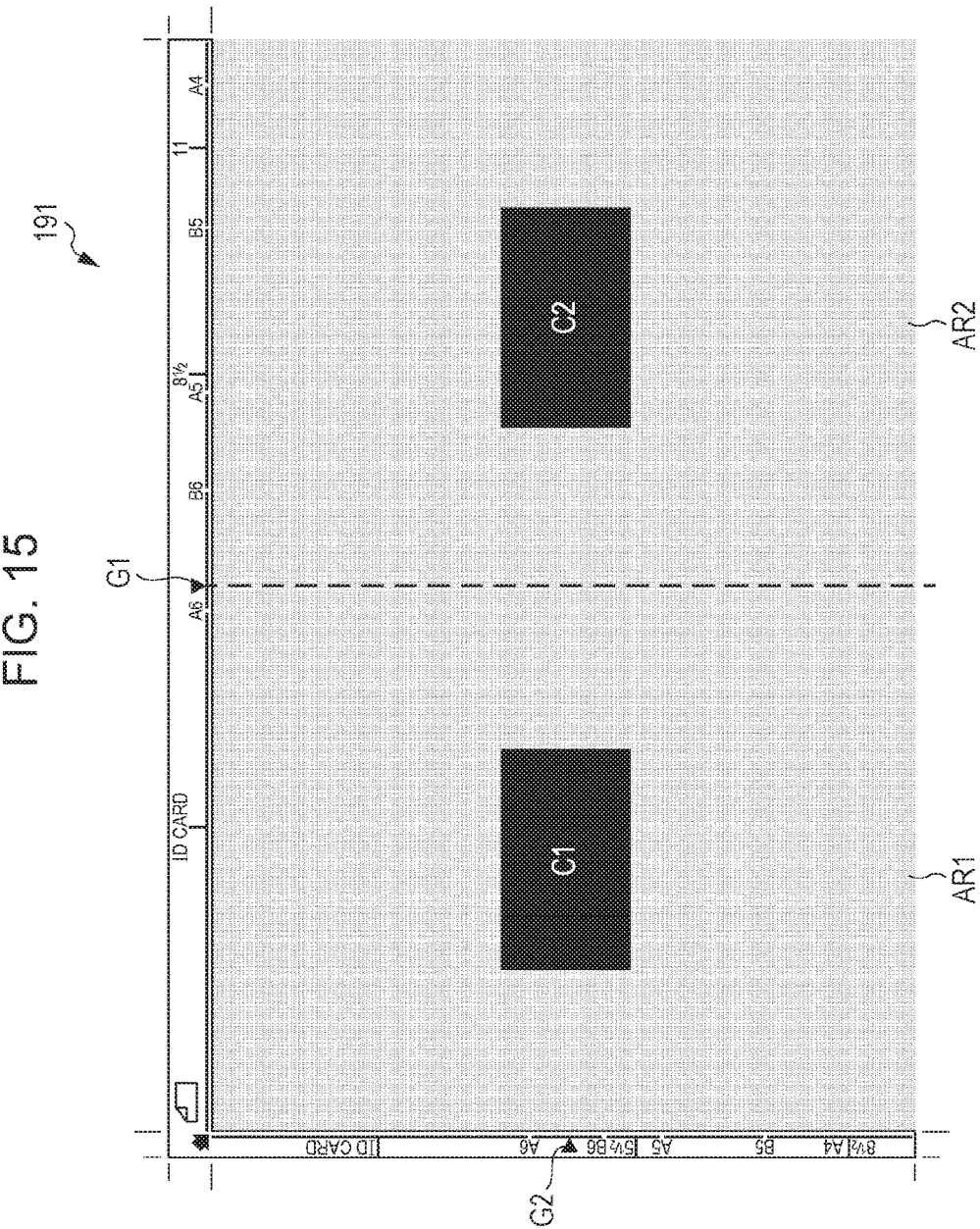
FIG. 15 is an illustration depicting an example of card layout on the platen in FIG. 4.
Figure 16:
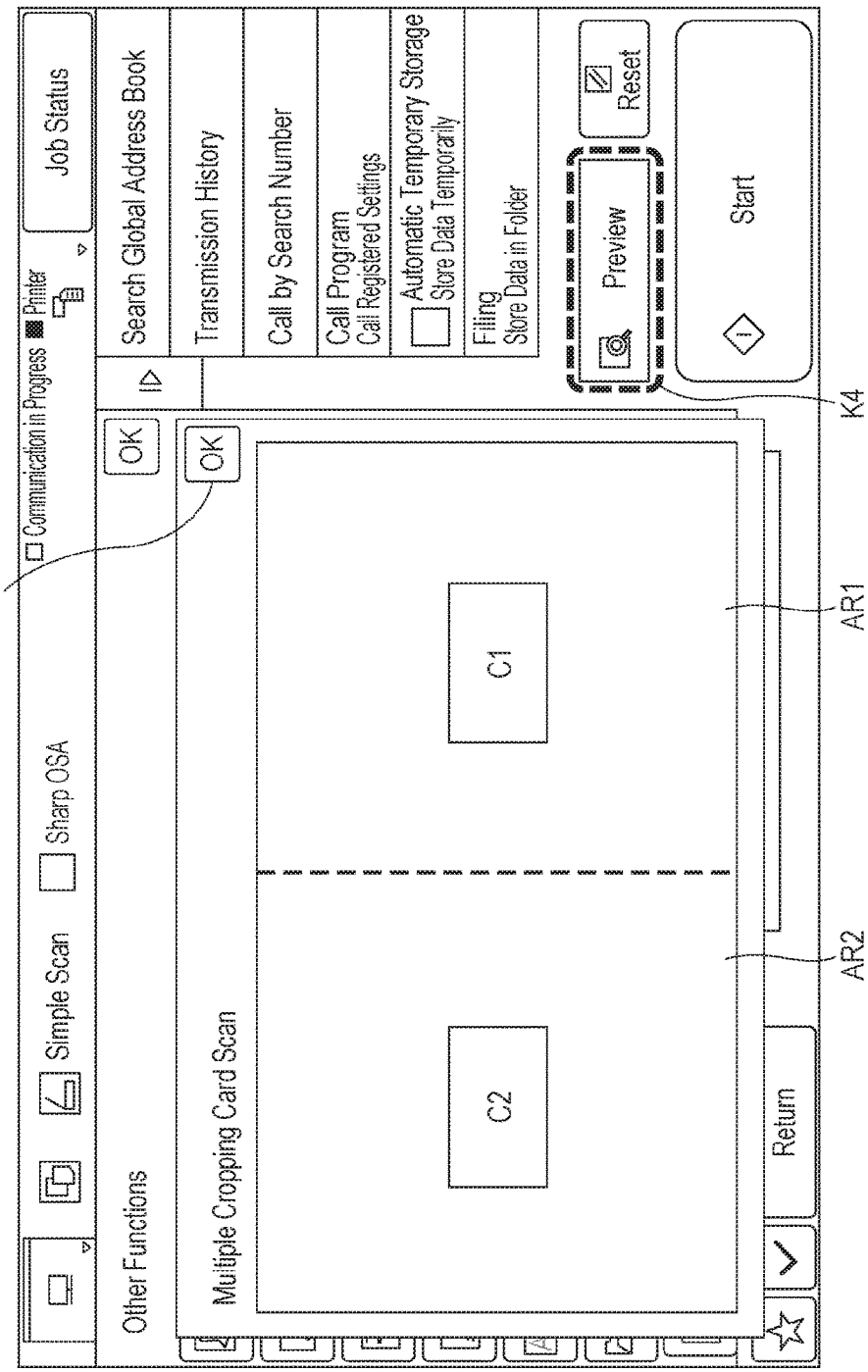
FIG. 16 is an illustration depicting an example of a preview screen of the front surfaces of the cards scanned as depicted in FIG. 15.
Figure 17:
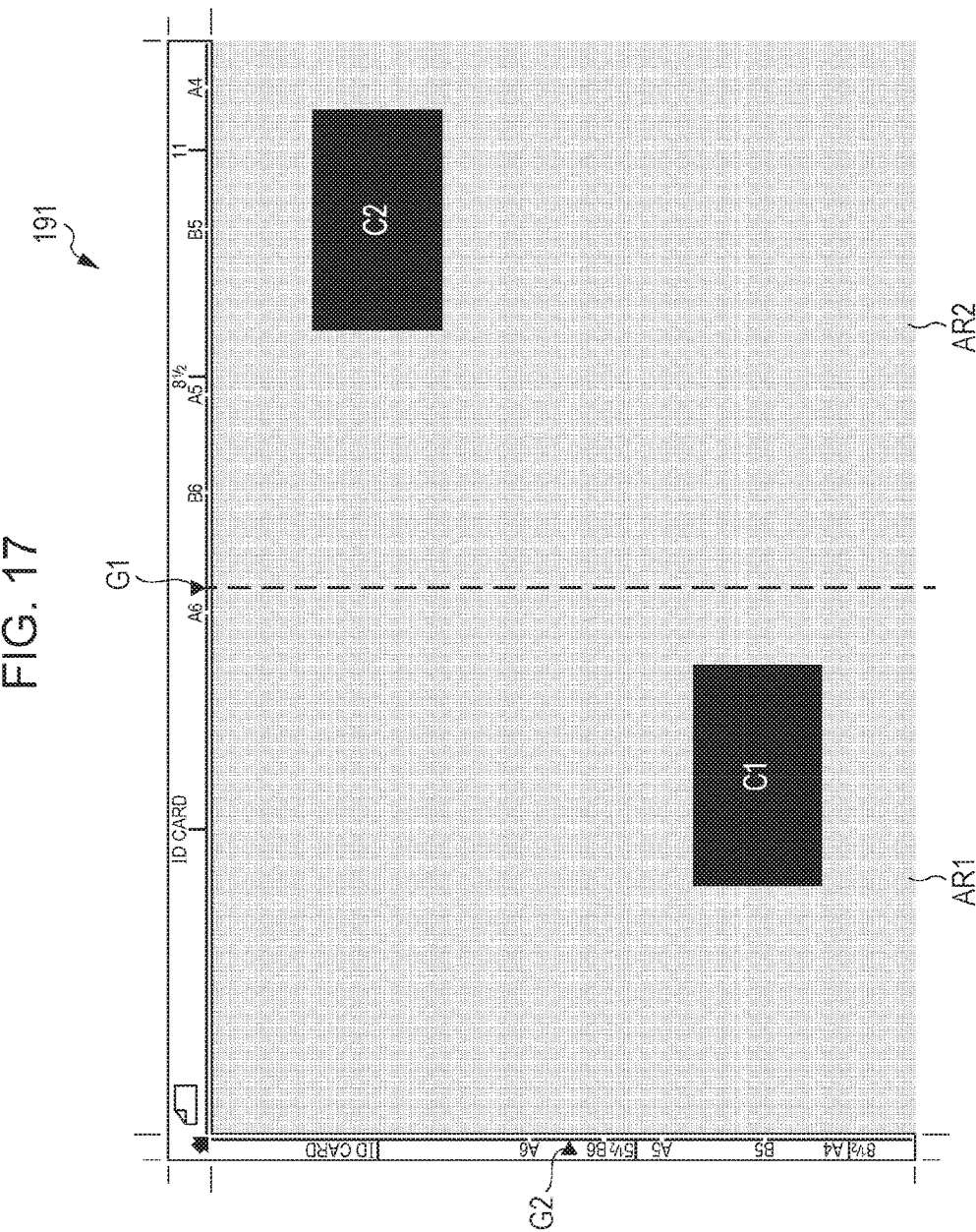
FIG. 17 is an illustration depicting another example of card layout on the platen in FIG. 4.
Figure 18:
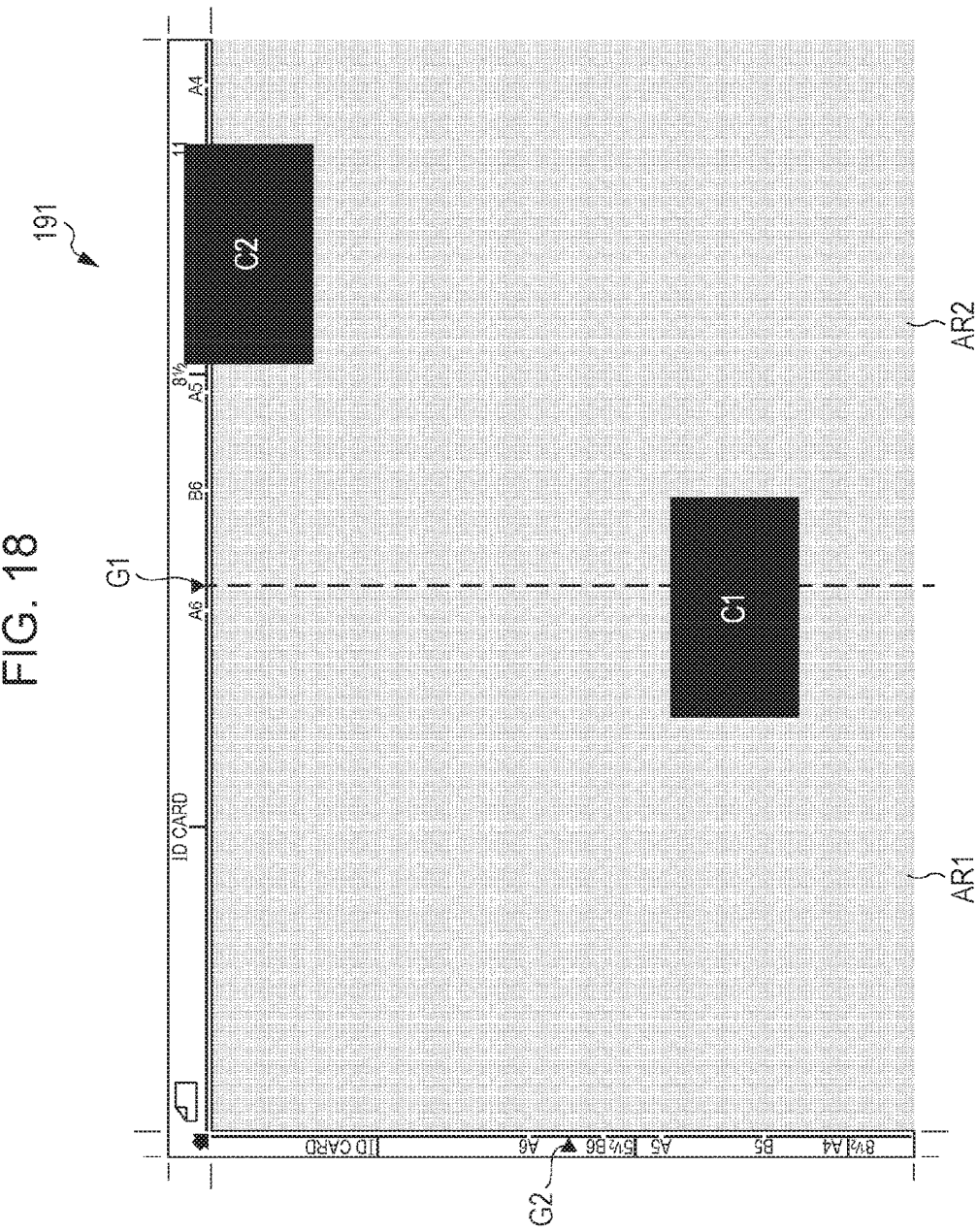
FIG. 18 is an illustration depicting an example of improper card layout on the platen in FIG. 4.
Figure 19:
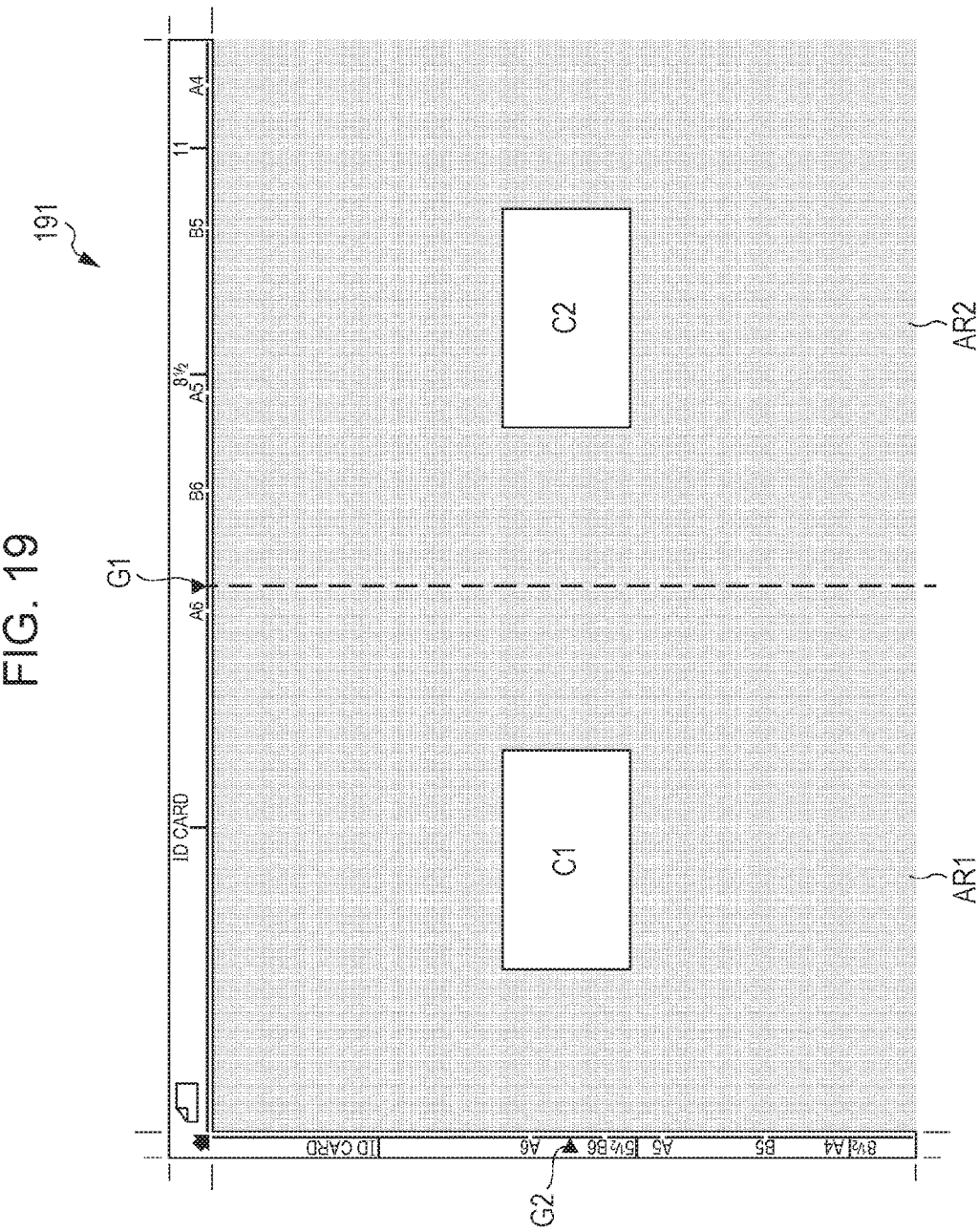
FIG. 19 is an illustration depicting an example of card layout on the platen in FIG. 4.
Figure 20:
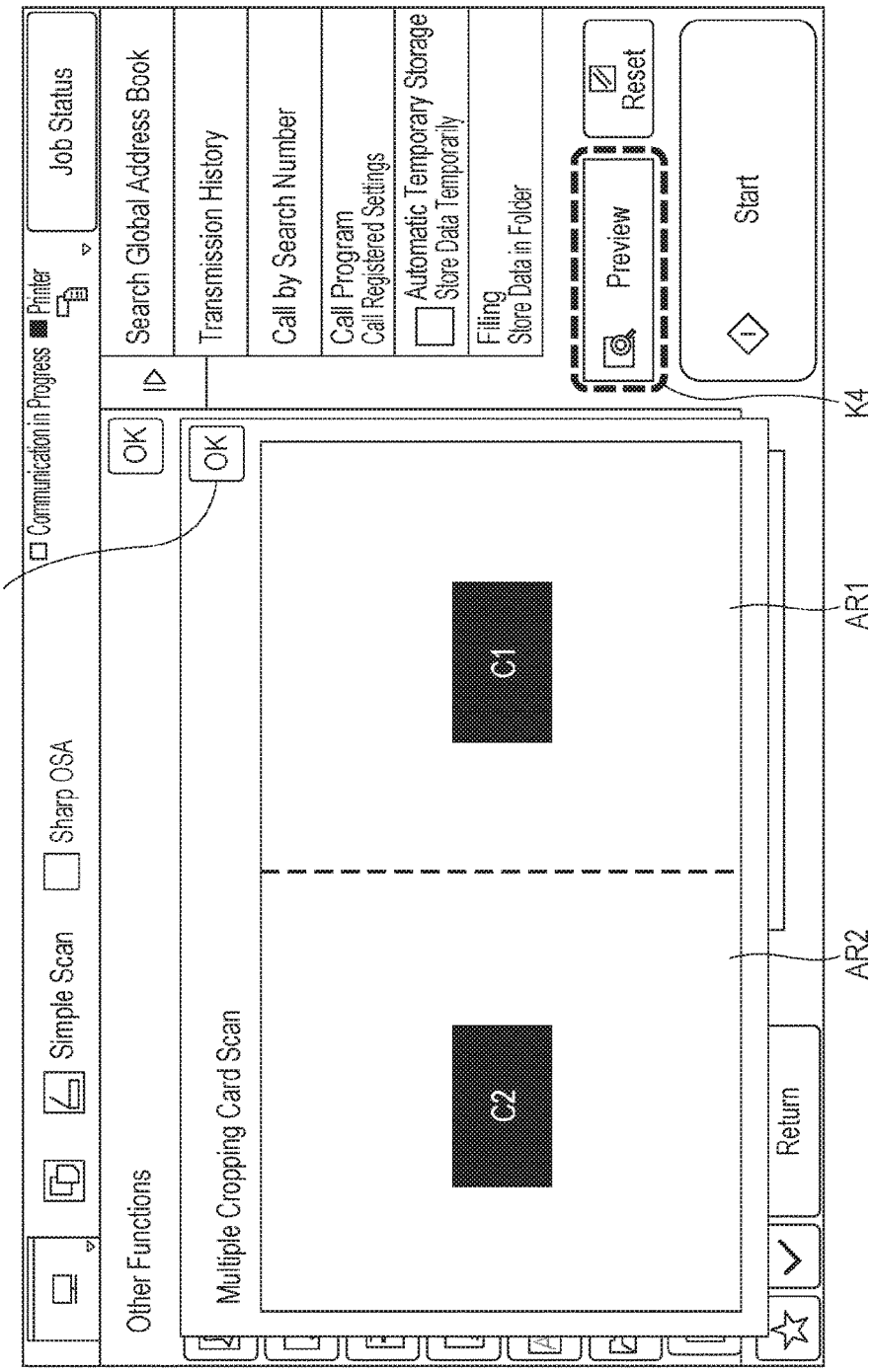
FIG. 20 is an illustration depicting an example of a preview screen of the back surfaces of the cards scanned as depicted in FIG. 19.
Figure 21:
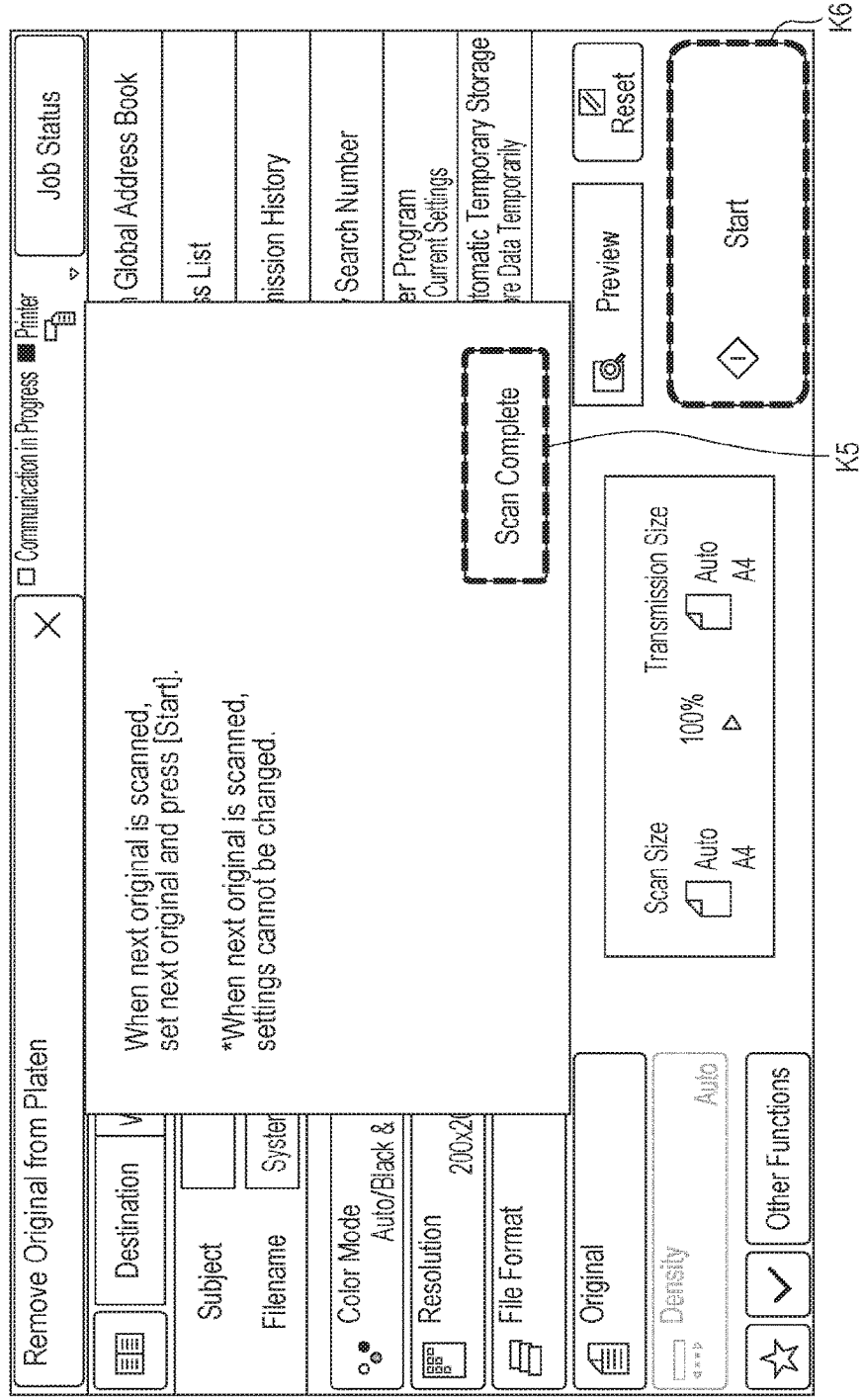
FIG. 21 is an illustration depicting an example of a confirmation message checking whether another scan is to be performed.
Figure 22:
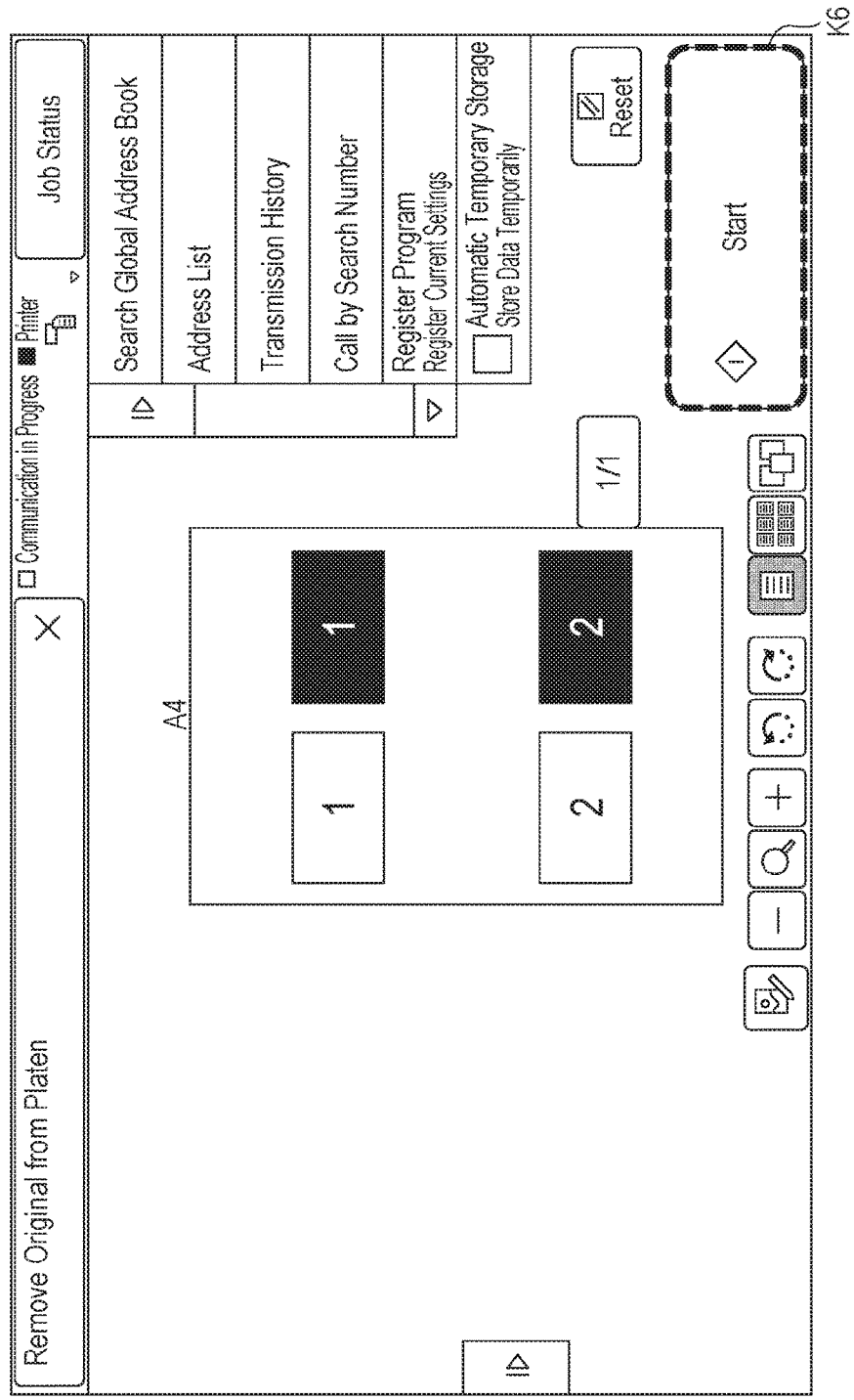
FIG. 22 is an illustration depicting an example of a preview screen of the front and back surfaces of cards displayed in accordance with a selected transmission layout.
Figure 23B:
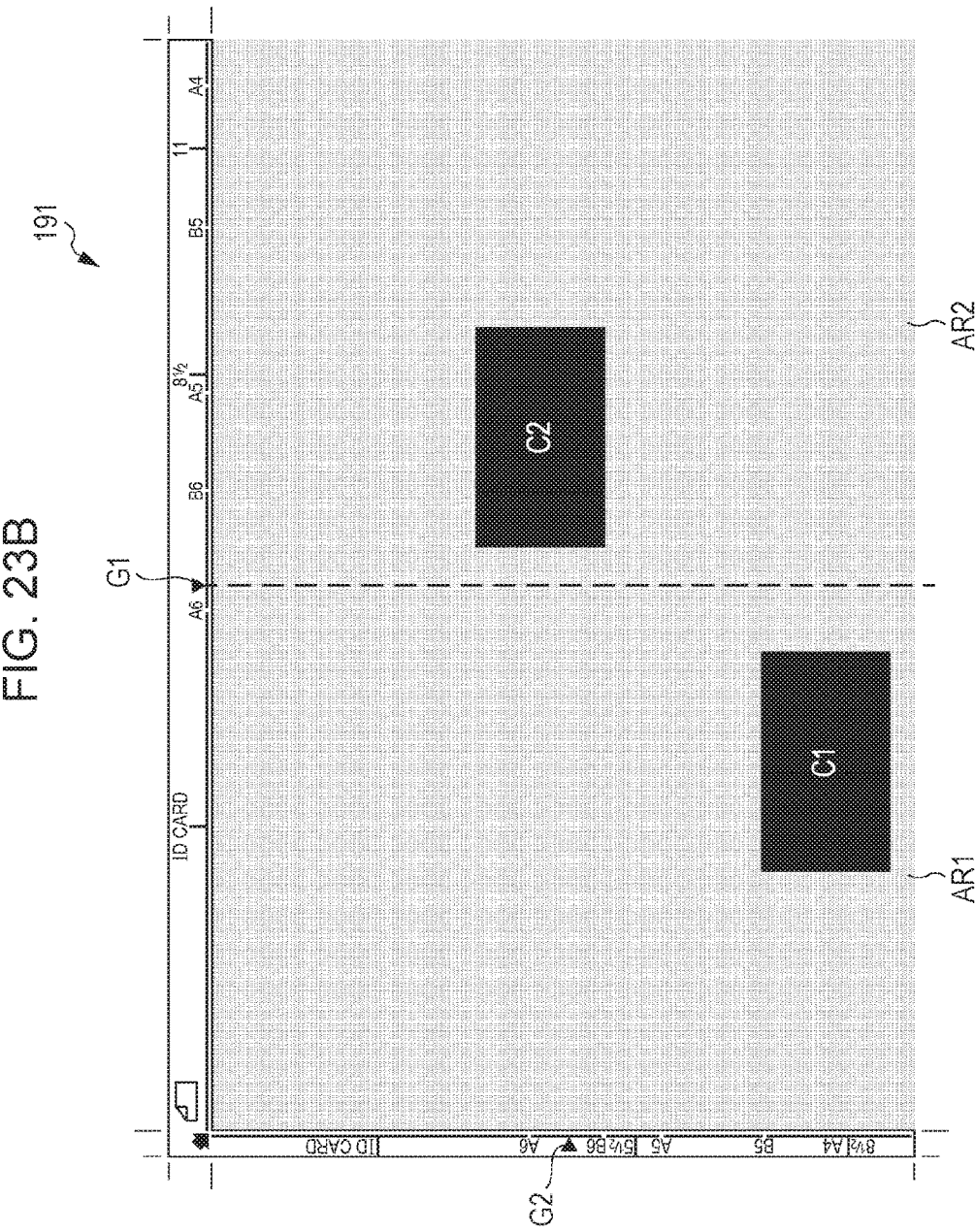

Next, referring to FIGS. 9 to 22 and FIGS. 23A and 23B, an example of an operating procedure for card scan performed by the digital multifunction peripheral 1 according to the first embodiment of the present disclosure will be described. FIGS. 9 to 11 and FIG. 13 are illustrations depicting the example of the operating procedure for card scan performed by the digital multifunction peripheral 1 in FIG. 1. FIG. 12 is an enlarged illustration of a setting screen SS1 for card scan depicted in FIG. 11. FIG. 14 is an enlarged illustration of a setting screen SS2 for selecting a transmission layout depicted in FIG. 13. FIG. 15 is an illustration depicting an example layout of cards C1 and C2 on the platen 191 in FIG. 4. FIG. 16 is an illustration depicting an example of a preview screen of the front surfaces of the cards C1 and C2 scanned as depicted in FIG. 15. FIG. 17 is an illustration depicting another example layout of the cards C1 and C2 on the platen 191 in FIG. 4. FIG. 18 is an illustration depicting an example of improper layout of the cards C1 and C2 on the platen 191 in FIG. 4. FIG. 19 is an illustration depicting an example layout of the cards C1 and C2 on the platen 191 in FIG. 4. FIG. 20 is an illustration depicting an example of a preview screen of the back surfaces of the cards C1 and C2 scanned as depicted in FIG. 19. FIG. 21 is an illustration depicting an example of a confirmation message checking whether another scan is to be performed. FIG. 22 is an illustration depicting an example of a preview screen of the front and back surfaces of the cards C1 and C2 displayed in accordance with a selected transmission layout. FIGS. 23A and 23B are illustrations depicting example layouts of the cards C1 and C2 on the platen 191 in FIG. 4. FIG. 23A depicts an example layout for scanning the back surfaces of the cards C1 and C2, and FIG. 23B depicts an example layout for scanning the front surfaces of the cards C1 and C2.

Figure 9:
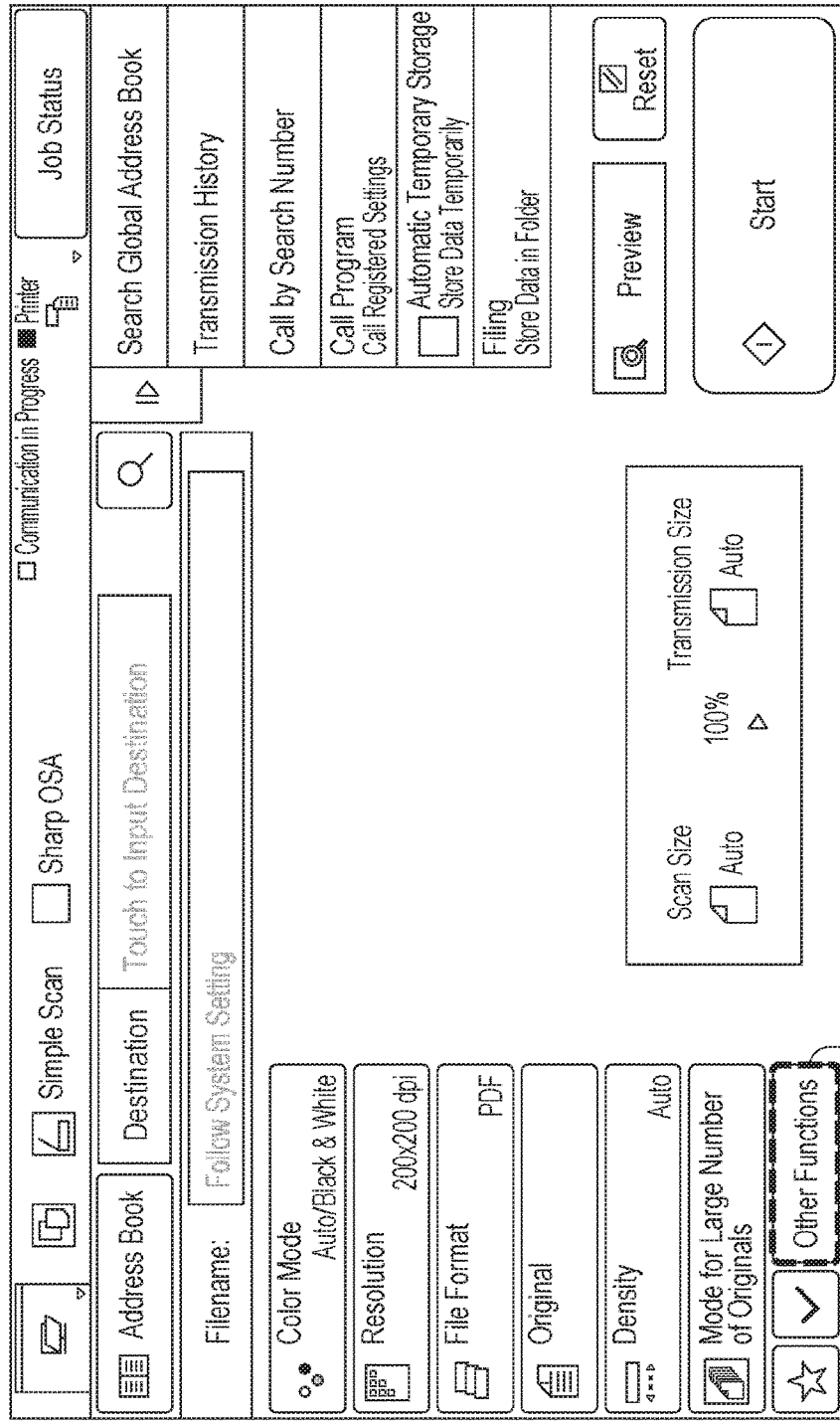
FIG. 9 is an illustration depicting an example of an operating procedure for card scan performed by the digital multifunction peripheral in FIG. 1.
Figure 10:
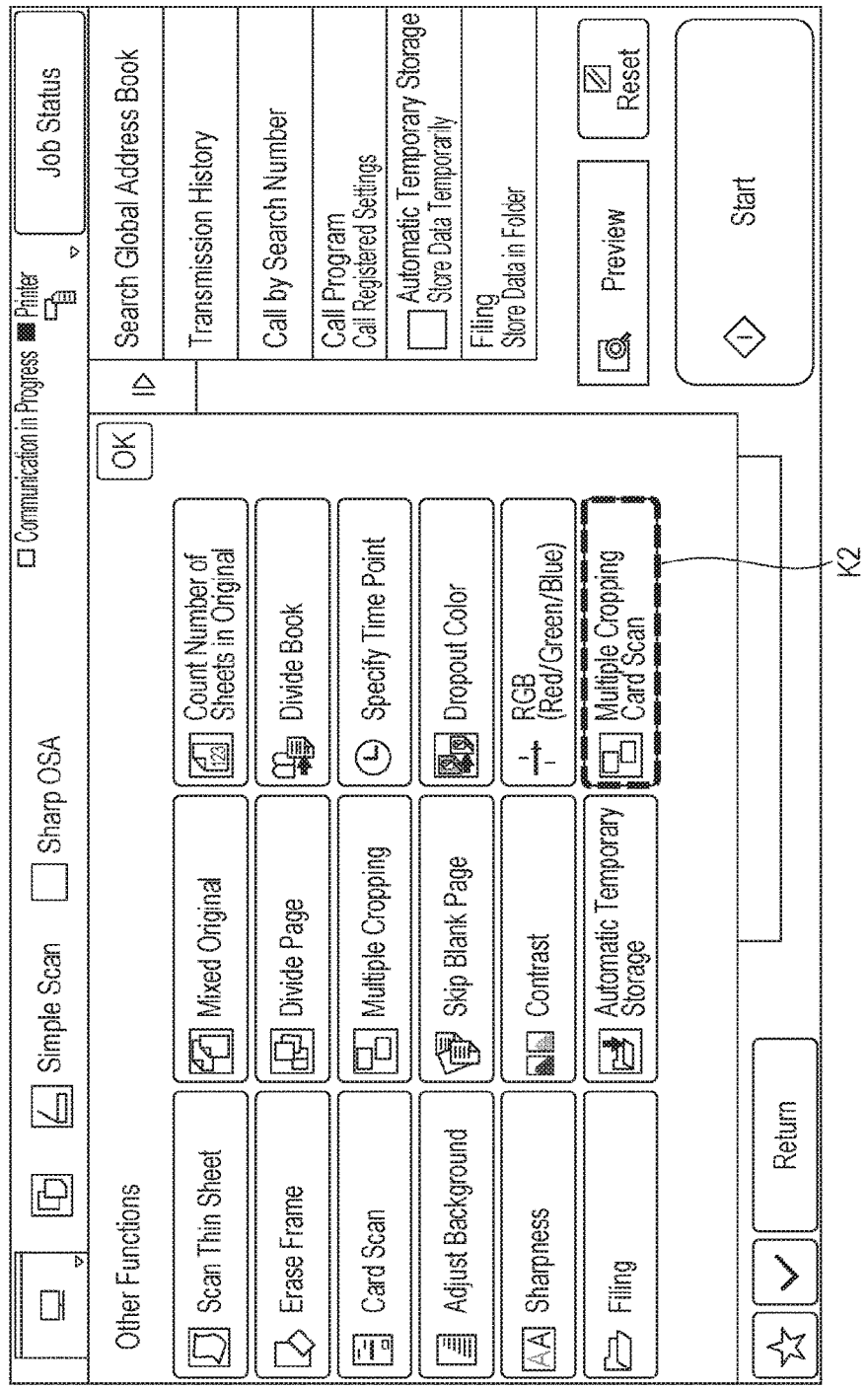
FIG. 10 is an illustration depicting the example of the operating procedure for card scan performed by the digital multifunction peripheral in FIG. 1.

First, as depicted in FIG. 9, a user touches an "Other Functions" key K1 on the display operation unit 171. Next, as depicted in FIG. 10, the user touches "Multiple Cropping Card Scan" key K2 to select the multi-card scan mode.

Figure 11:
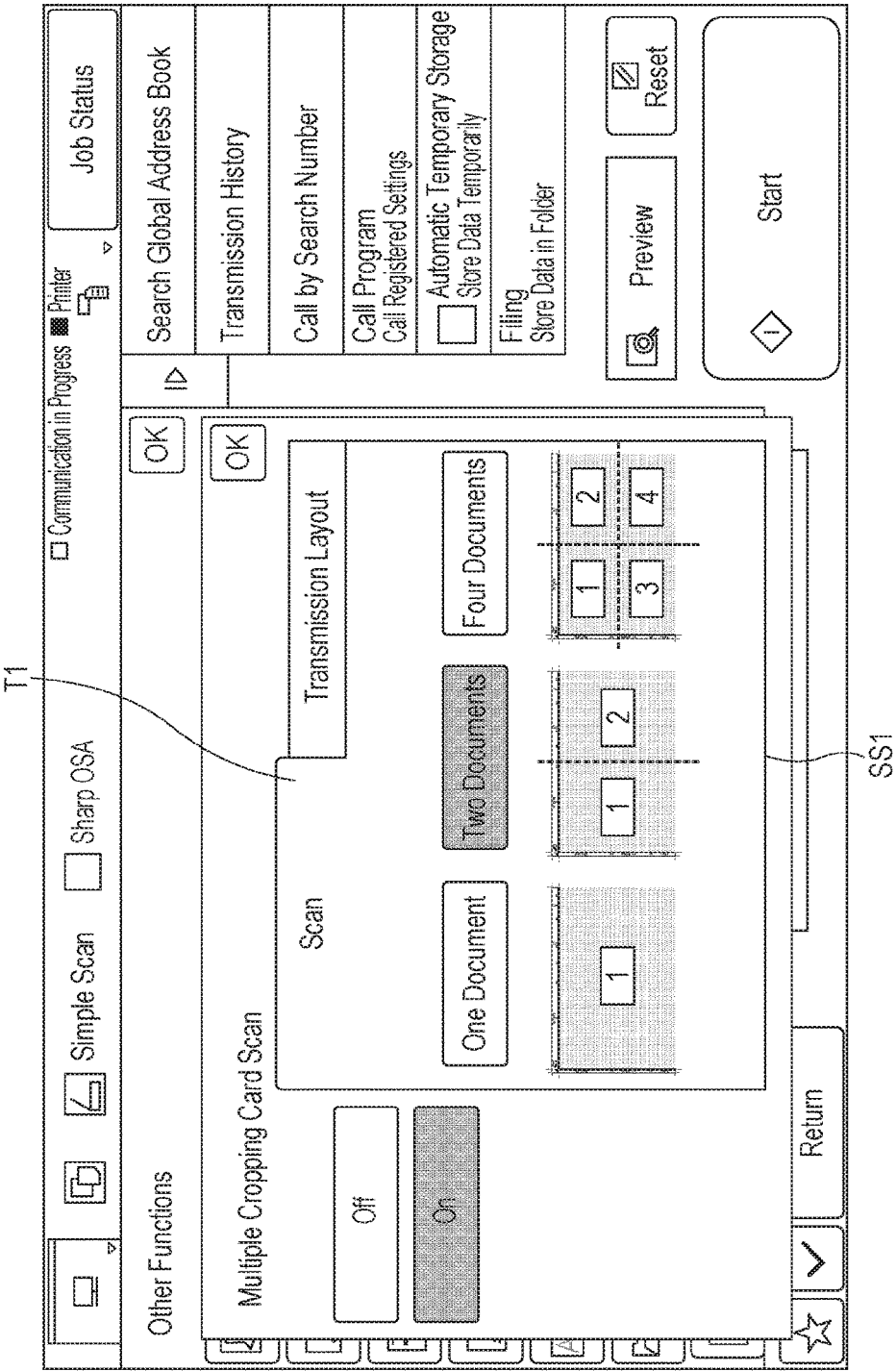
FIG. 11 is an illustration depicting the example of the operating procedure for card scan performed by the digital multifunction peripheral in FIG. 1.
Figure 12:
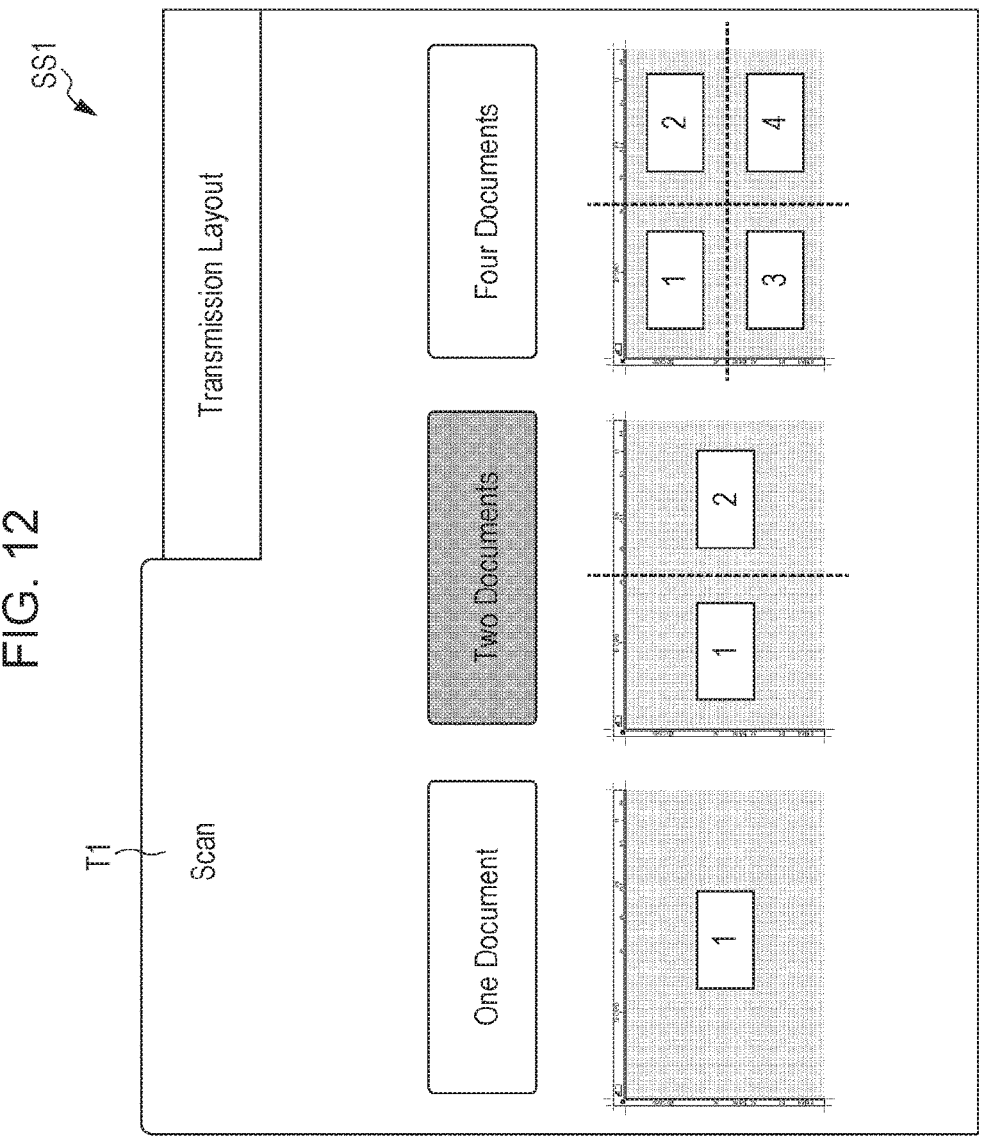
FIG. 12 is an enlarged illustration of a setting screen for card scan depicted in FIG. 11.

Then, as depicted in FIG. 11, the setting screen SS1 for card scan is displayed on the display operation unit 171.

When two cards are to be scanned, a vertical boundary line that divides an area representing the platen 191 into the left area and the right area is displayed on the setting screen SS1. When four cards are to be scanned, two boundary lines, vertical and horizontal, that divide the area representing the platen 191 into four areas are displayed on the setting screen SS1. Thus, the user easily places the front and back surfaces of one of the plurality of documents in the same area using these boundary lines as a guide.

In the example setting screen SS1 depicted in FIG. 12, "Two Documents" is selected from settings "One Document", "Two Documents", and "Four Documents" for card scan.

Figure 13:
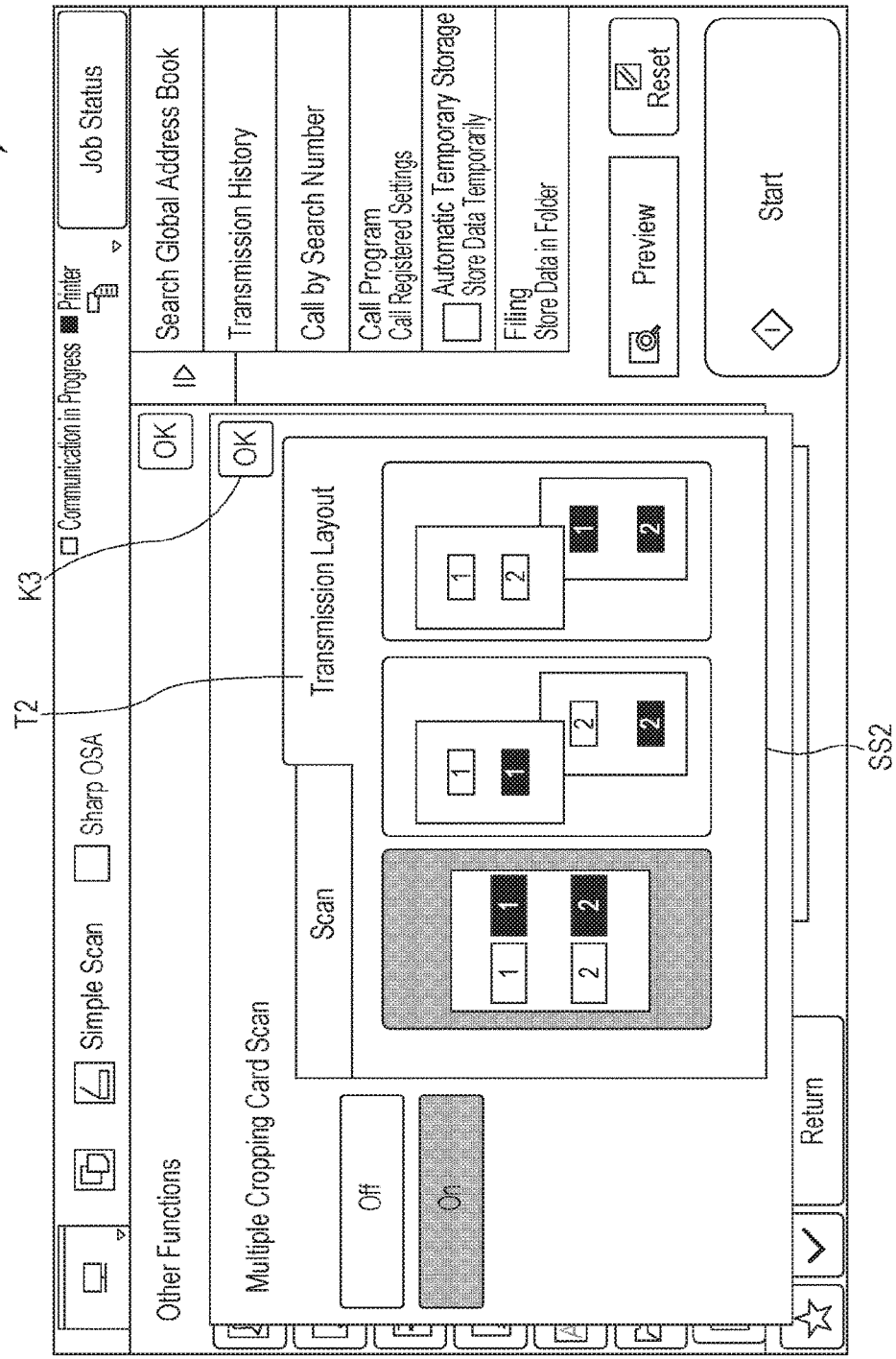
FIG. 13 is an illustration depicting the example of the operating procedure for card scan performed by the digital multifunction peripheral in FIG. 1.
Figure 14:
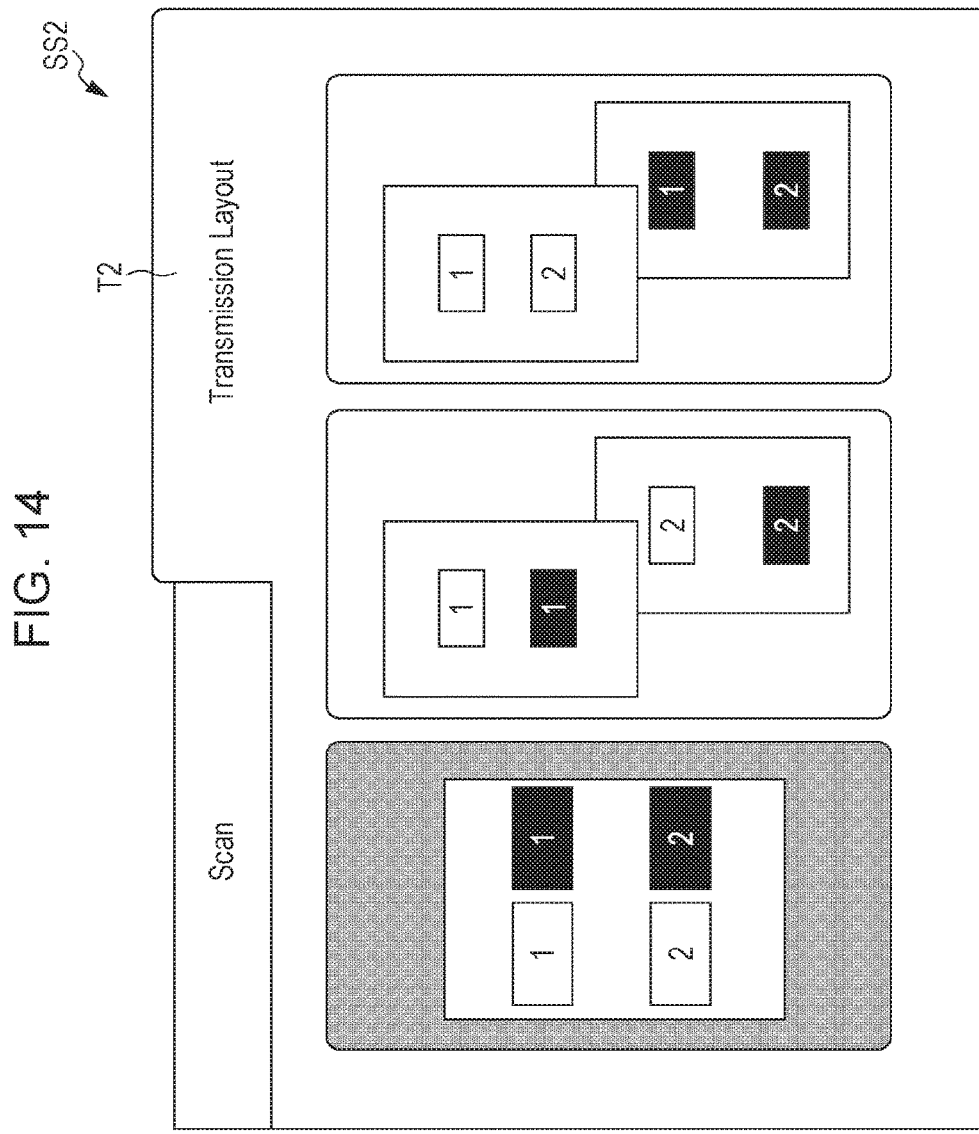
FIG. 14 is an enlarged illustration of a setting screen for selecting a transmission layout depicted in FIG. 13.

Referring next to FIG. 13, when the user selects a "Transmission Layout" tab T2, the setting screen SS2 for transmission layout is displayed on the display operation unit 171 as depicted in FIG. 14. In the example setting screen SS2 depicted in FIG. 14, a transmission layout on the left is selected from three transmission layouts that are displayed.

In FIGS. 13 and 14, a number displayed in a card represents a kind of the card. A card with a black number on a white background represents the front surface, and a card with a white number on a black background represents the back surface. Hereinafter, cards are represented in the same manner. The layout on the left in FIG. 14 represents a layout used for transmitting images of the front and back surfaces of the two cards to a sheet of paper. The layout in the center represents a layout used for transmitting images of the front and back surfaces of one of the two cards to a sheet of paper and images of the front and back surfaces of the other of the two cards to another sheet of paper. The layout on the right represents a layout used for transmitting images of the front surfaces of the two cards to a sheet of paper and images of the back surfaces of the two cards to another sheet of paper.

When the setting input for "Scan" and "Transmission Layout" is completed, the user touches the "OK" key K3.

Next, the user opens the platen cover 19 and places a plurality of cards (two cards C1 and C2 in FIG. 15) on the platen 191 as depicted in FIG. 15. At this time, the user places the cards C1 and C2 on areas AR1 and AR2, respectively, so that the front surfaces of the cards are scanned. The areas AR1 and AR2 are areas located on both sides of a triangular arrowhead G1 on a document guide surrounding the platen 191.

The triangular arrowhead in FIG. 15 is just an example, and a line (indicating line) or other symbols may be used. These symbols are printed on the document guide. Document sizes are also printed on the document guide in FIG. 15.

Although a dotted line representing a boundary line passing through the triangular arrowhead G1 is drawn to indicate the areas AR1 and AR2 clearly in the example depicted in FIG. 15, no dotted line is drawn on the platen 191.

When three to four cards are placed, each of the cards is placed in one of four areas AR1 to AR4 on the platen 191 divided by two boundary lines, one of which passes through the triangular arrowhead G1, and the other of which passes through another triangular arrowhead G2. More than four cards are placed in a similar manner.

After placing the two cards C1 and C2 in the areas AR1 and AR2, respectively, the user touches a "Preview" key K4 on the display operation unit 171. Then, as depicted in FIG. 16, a preview screen of the front surfaces of the scanned cards C1 and C2 is displayed on the display operation unit 171. A dotted line representing the boundary between the areas AR1 and AR2 is displayed on the preview screen.

Although an example in which the cards C1 and C2 are placed at the centers of the areas AR1 and AR2, respectively, is depicted in FIG. 15, the cards C1 and C2 may be placed anywhere in the areas AR1 and AR2, respectively, as depicted in FIG. 17.

The image processing unit 14 identifies four vertexes of each of the cards C1 and C2 from image data obtained by scanning the cards C1 and C2 and extracts only a piece of image data corresponding to a quadrilateral region defined by the four vertexes. Thus, wherever the cards are placed in the areas, only the pieces of image data corresponding to the cards C1 and C2 are extracted. As depicted in FIG. 16, preview images of the extracted pieces of image data corresponding to the cards C1 and C2 are displayed at the center of the areas AR1 and AR2, respectively, on the preview screen.

In contrast, as depicted in FIG. 18, when the card C1 is placed on the boundary line passing through the triangular arrowhead G1 or the card C2 is placed beyond the area that is to be scanned on the platen 191, images of the cards C1 and C2 are not properly obtained.

When the user checks the preview screen of the front surfaces of the cards in FIG. 16 and finds no problem, the user touches the "OK" key K3.

Next, the user turns over the two cards C1 and C2 and places the cards on the platen 191 as depicted in FIG. 19 so that the back surfaces of the cards are scanned. Thereafter, the user touches the "Preview" key K4 on the display operation unit 171 depicted in FIG. 20. Then, as depicted in FIG. 20, a preview screen of the back surfaces of the scanned cards C1 and C2 is displayed on the display operation unit 171. When the user checks the preview screen of the back surfaces of the cards and finds no problem, the user touches the "OK" key K3.

Then, as depicted in FIG. 21, a confirmation message to check whether another scan is to be performed is displayed on the display operation unit 171. When no other scan is performed, the user touches the "Scan Complete" key K5. When another scan is performed, the user places another document and touches the "Start" key K6.

Next, as depicted in FIG. 22, a preview screen of the front and back surfaces of the scanned cards C1 and C2 is displayed on the display operation unit 171 in accordance with the layout selected in the setting for the transmission layout. When the user checks the preview screen and finds no problem, the user touches the "Start" key K6 to start printing.

As depicted in FIGS. 23A and 23B, the cards C1 and C2 may be placed anywhere in the areas AR1 and AR2, respectively. A position where each of the cards C1 and C2 is placed after the cards are turned over may be different from the position where each of the cards is placed before turned over, and the front and back surfaces of each of the cards may be placed at different positions as depicted in FIGS. 23A and 23B.

In this way, the user may place the cards C1 and C2 anywhere in the predetermined areas AR1 and AR2, respectively, and scan the cards. Thus, it is possible to place the plurality of cards C1 and C2 on the platen 191 with less restriction than in the related art to scan the cards at a single time.

Second Embodiment

Next, referring to FIGS. 24A and 24B, FIGS. 25A to 25D, FIGS. 26A to 26D, and FIGS. 27A and 27B, the digital multifunction peripheral 1 according to a second embodiment of the present disclosure will be described. FIGS. 24A and 24B, FIGS. 25A to 25D, FIGS. 26A to 26D, and FIGS. 27A and 27B are illustrations each depicting a transmission layout according to the second embodiment of the present disclosure.

Figure 24A:
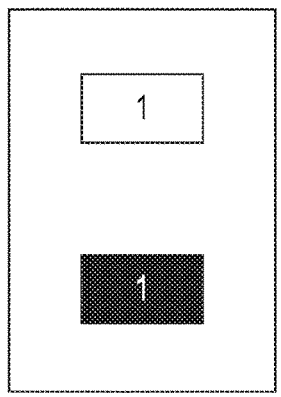
FIGS. 24A and 24B are illustrations each depicting an example of a transmission layout according to a second embodiment of the present disclosure.
Figure 24B:
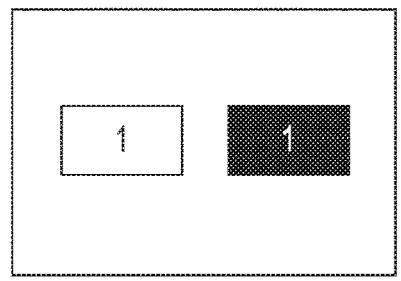

FIGS. 24A and 24B each depict an example layout for transmitting images of the front and back surfaces of one card C1 to a sheet of paper. FIG. 24A depicts an example layout for transmission to a sheet in portrait orientation, and FIG. 24B depicts an example layout for transmission to a sheet in landscape orientation.

In the example depicted in FIG. 24A, images of the front and back surfaces of the card C1 are arranged in a column from top to bottom in this order on a sheet of paper in portrait orientation. In the example depicted in FIG. 24B, images of the front and back surfaces of the card C1 are arranged in a row from left to right in this order on a sheet of paper in landscape orientation.

The user selects the layout depicted in FIG. 24A for the transmission to a sheet in portrait orientation and the layout depicted in FIG. 24B for the transmission to a sheet in landscape orientation.

Figure 25A:
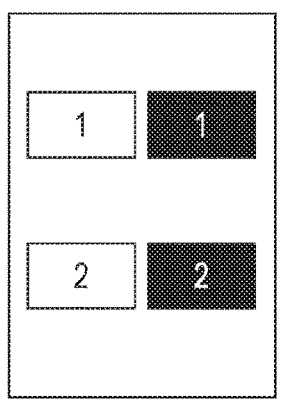
FIGS. 25A to 25D are illustrations each depicting an example of a transmission layout according to the second embodiment of the present disclosure.
Figure 25B:
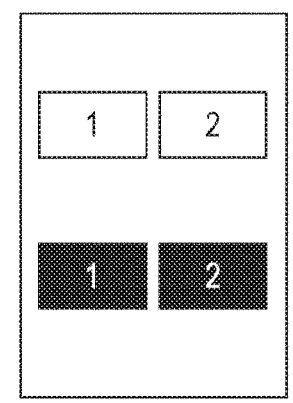

FIGS. 25A to 25D each depict an example layout for transmitting images of the front and back surfaces of two cards C1 and C2 to a sheet of paper. FIGS. 25A and 25B each depict an example layout for transmission to a sheet in portrait orientation, and FIGS. 25C and 25D each depict an example layout for transmission to a sheet in landscape orientation.

In the examples depicted in FIGS. 25A and 25B, images of the front and back surfaces of the two cards C1 and C2 are arranged in two rows and two columns on a sheet of paper in portrait orientation.

In the following descriptions, a column is denoted by a first column, a second column, or the like from left to right, and a row is denoted by a first row, a second row, or the like from top to bottom. In addition, in the following descriptions, when a plurality of images are arranged in a column, the plurality of images are placed from top to bottom in succession, and when a plurality of images are arranged in a row, the plurality of images are placed from left to right in succession.

In the example depicted in FIG. 25A, images of the front and back surfaces of the first card C1 are arranged in a line in the first row, and images of the front and back surfaces of the second card C2 are arranged in a line in the second row. In the example depicted in FIG. 25B, images of the front and back surfaces of the first card C1 are arranged in a line in the first column, and images of the front and back surfaces of the second card C2 are arranged in a line in the second column.

Figure 25C:
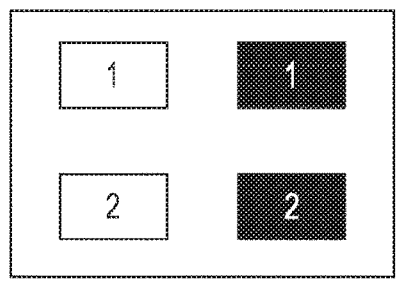
Figure 25D:
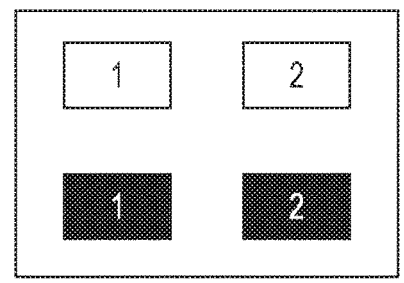

In the examples depicted in FIGS. 25C and 25D, images of the front and back surfaces of the two cards C1 and C2 are arranged in two rows and two columns on a sheet of paper in landscape orientation. Specifically, in the example depicted in FIG. 25C, images of the front and back surfaces of the first card C1 are arranged in a line in the first row, and images of the front and back surfaces of the second card C2 are arranged in a line in the second row. In the example depicted in FIG. 25D, images of the front and back surfaces of the first card C1 are arranged in a line in the first column, and images of the front and back surfaces of the second card C2 are arranged in a line in the second column.

The user selects the layout depicted in FIG. 25A or 25B for the transmission to a sheet in portrait orientation and the layout depicted in FIG. 25C or 25D for the transmission to a sheet in landscape orientation.

Figure 26A:
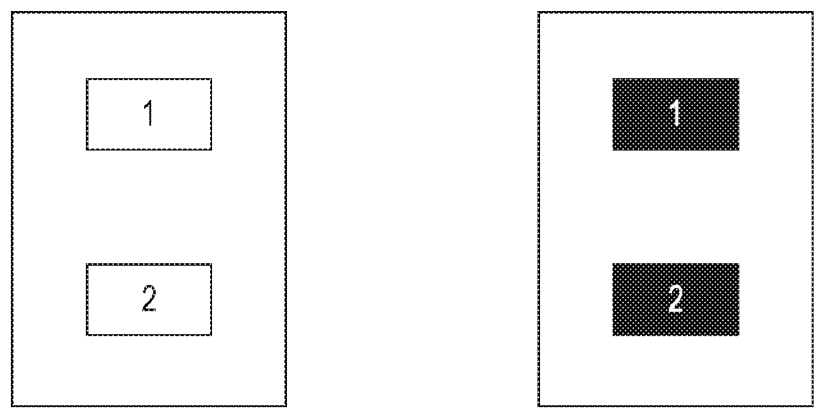
FIGS. 26A to 26D are illustrations each depicting an example of a transmission layout according to the second embodiment of the present disclosure.
Figure 26B:
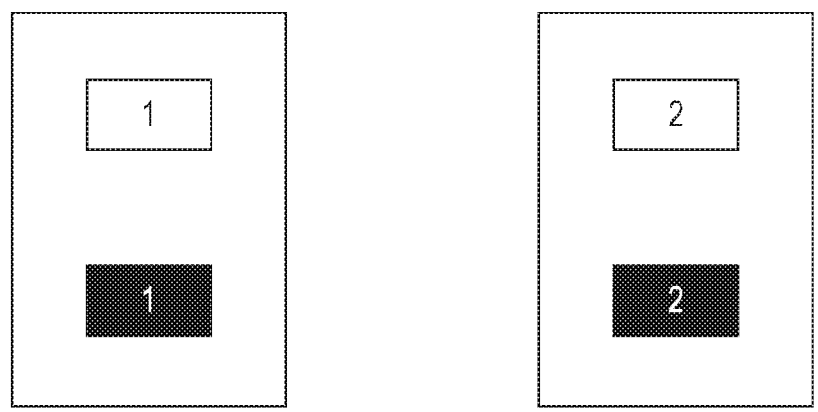

FIGS. 26A to 26D each depict an example layout for transmitting images of the front and back surfaces of the two cards C1 and C2 to two sheets of paper. FIGS. 26A and 26B each depict an example layout for transmission to sheets in portrait orientation, and FIGS. 26C and 26D each depict an example layout for transmission to sheets in landscape orientation.

In the examples depicted in FIGS. 26A and 26B, images of the front and back surfaces of the two cards C1 and C2 are arranged in a column on each of the two sheets in portrait orientation. Specifically, in the example depicted in FIG. 26A, images of the front surfaces of the two cards C1 and C2 are arranged in a column on the first sheet, and images of the back surfaces of the two cards C1 and C2 are arranged in a column on the second sheet. In the example depicted in FIG. 26B, images of the front and back surfaces of the first card C1 are arranged in a column on the first sheet, and images of the front and back surfaces of the second card C2 are arranged in a column on the second sheet.

Figure 26C:
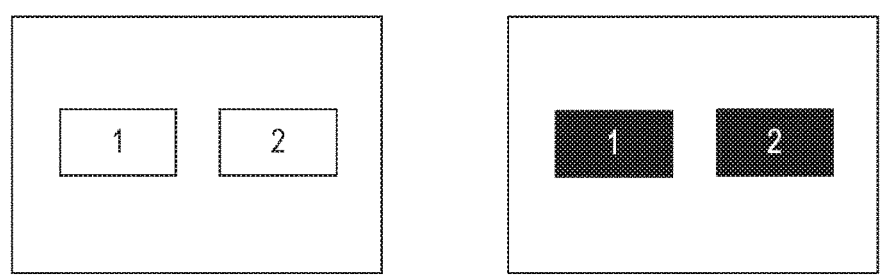
Figure 26D:
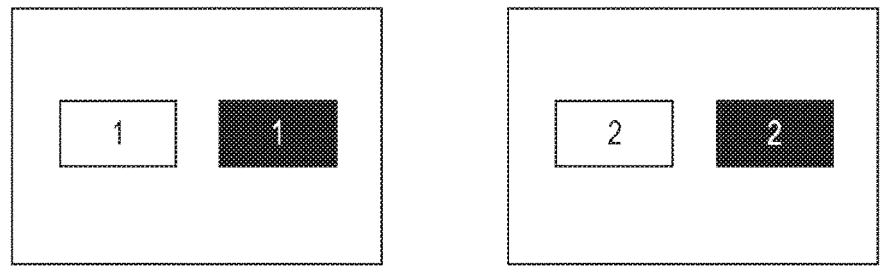

In the examples depicted in FIGS. 26C and 26D, images of the front and back surfaces of the two cards C1 and C2 are arranged in a row on each of the two sheets in landscape orientation. Specifically, in the example depicted in FIG. 26C, images of the front surfaces of the two cards C1 and C2 are arranged in a row on the first sheet, and images of the back surfaces of the two cards C1 and C2 are arranged in a row on the second sheet. In the example depicted in FIG. 26D, images of the front and back surfaces of the first card C1 are arranged in a row on the first sheet, and images of the front and back surfaces of the second card C2 are arranged in a row on the second sheet.

The user selects the layout depicted in FIG. 26A or 26B for the transmission to a sheet in portrait orientation and the layout depicted in FIG. 26C or 26D for the transmission to a sheet in landscape orientation. These images may be printed on the front and back surfaces of one sheet of paper or on two sheets of paper separately.

Figure 27A:
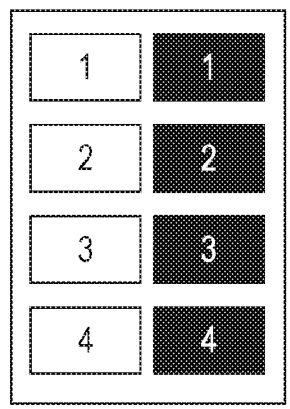
FIGS. 27A and 27B are illustrations each depicting an example of a transmission layout according to the second embodiment of the present disclosure.
Figure 27B:
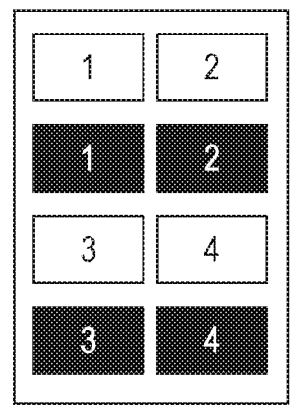
Figure 28A:
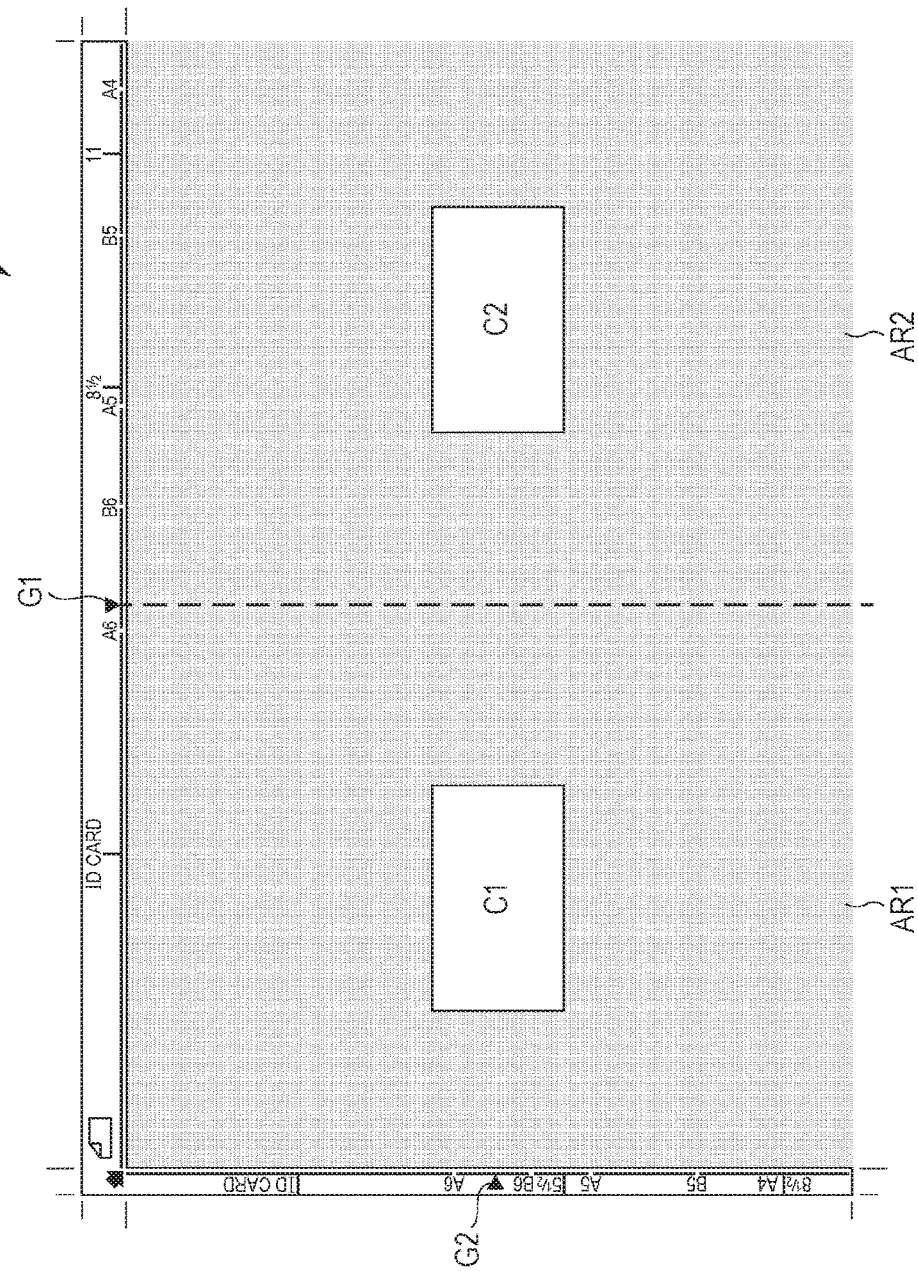
FIGS. 28A and 28B are illustrations depicting examples of improper card layout.
Figure 28B:
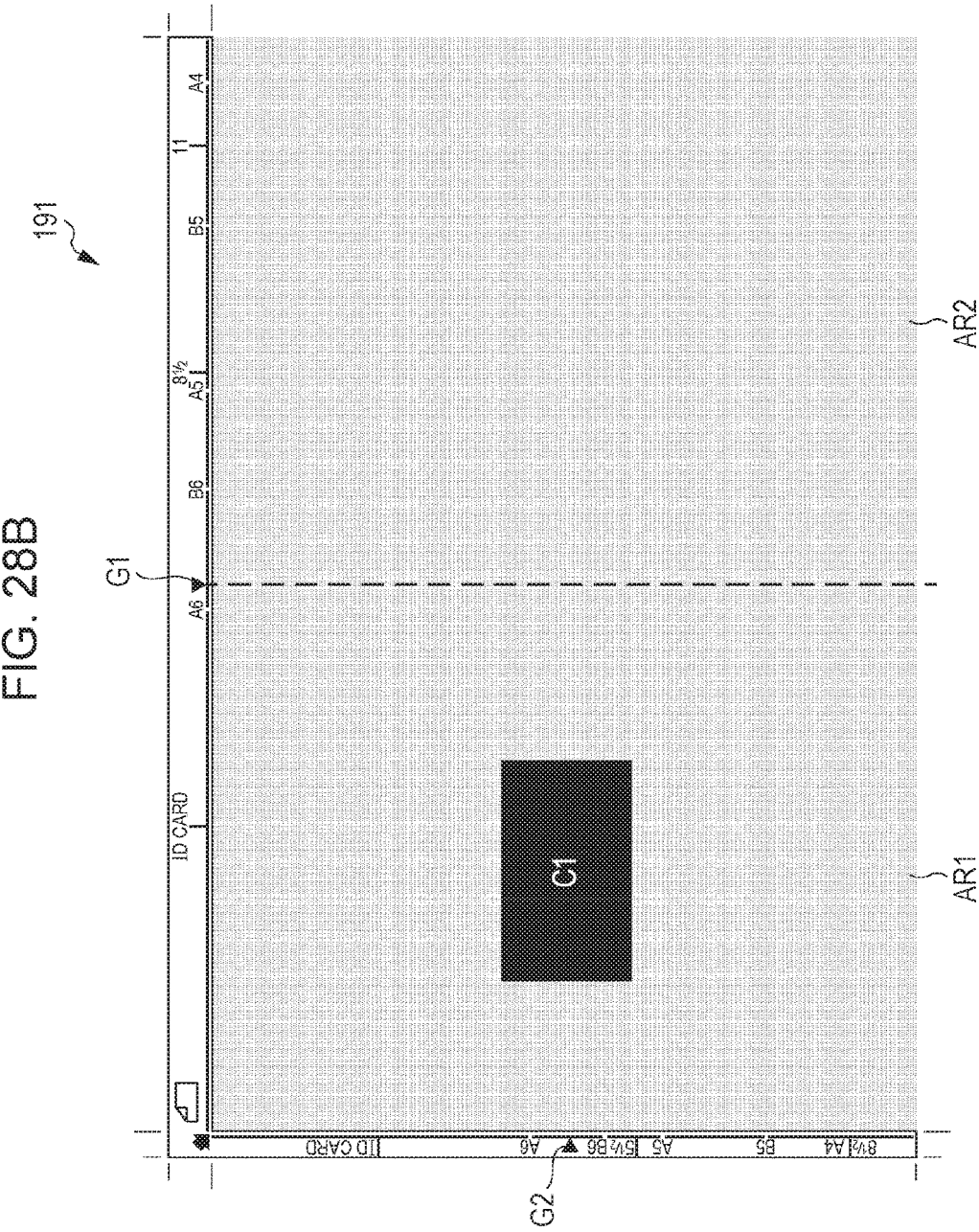
Figure 29B:
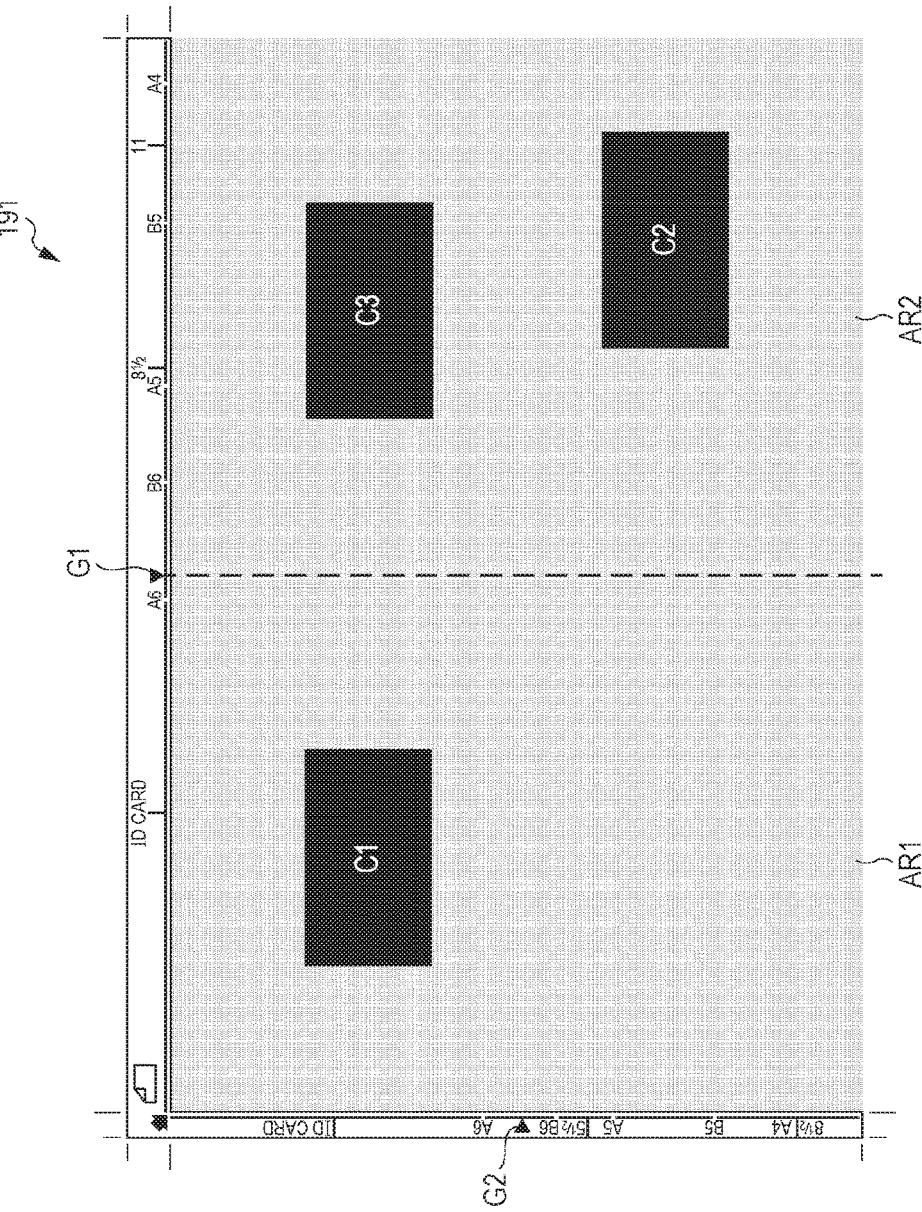

FIGS. 27A and 27B each depict an example layout for transmitting images of the front and back surfaces of four cards C1 to C4 to a sheet of paper. FIGS. 27A and 27B each depict the example layout for transmission to a sheet in portrait orientation.

In the examples depicted in FIGS. 27A and 27B, images of the front and back surfaces of the four cards C1 to C4 are arranged in four rows and two columns on a sheet of paper in portrait orientation. Specifically, in the example depicted in FIG. 27A, images of the front surfaces of the four cards C1 to C4 are arranged in a line in the first column, and images of the back surfaces of the four cards C1 to C4 are arranged in a line in the second column. In the example depicted in FIG. 27B, images of the front and back surfaces of the first card C1 are arranged in a line in the first column in the first and second rows, images of the front and back surfaces of the second card C2 are arranged in a line in the second column in the first and second rows, images of the front and back surfaces of the third card C3 are arranged in a line in the first column in the third and fourth rows, and images of the front and back surfaces of the fourth card C4 are arranged in a line in the second column in the third and fourth rows.

The user selects the layout depicted in FIG. 27A or 27B.

The transmission layout is not limited to the layouts described above, and this disclosure does not exclude a layout other than the above examples.

In this way, the user may select any layout as desired from the layouts produced based on the images of scanned cards without determining and setting a layout when placing the cards on the platen 191, and thus it is possible to print the front and back surfaces of a plurality of cards more easily than in the related art.

Third Embodiment

Next, referring to FIGS. 28A, 28B, 29A, 29B, 30A, 30B, 31A, and 31B, the digital multifunction peripheral 1 according to a third embodiment of the present disclosure will be described. FIGS. 28A, 28B, 29A, 29B, 30A, 30B, 31A, and 31B are illustrations depicting examples of improper card layout. FIGS. 28A, 29A, 30A, and 31A each depict an example layout for scanning the back surfaces of the cards, and FIGS. 28B, 29B, 30B, and 31B each depict an example layout for scanning the front surfaces of the cards.

As depicted in FIG. 18, when a plurality of cards are not properly placed in predetermined areas, the control unit 10 may cause the display operation unit 171 to display error information requesting the user to place properly the plurality of cards in the predetermined areas.

In addition, when an arrangement of the cards C1 and C2 placed in the areas AR1 and AR2 is different for the front surface and for the back surface, the control unit 10 may cause the display operation unit 171 to display error information requesting the user to place properly the plurality of cards in the predetermined areas.

Examples of a case where the arrangement of the cards C1 and C2 placed in the areas AR1 and AR2 is different for the front surface and for the back surface include a case where the number of the cards C1 and C2 placed in the areas AR1 and AR2 is different for the front surface and for the back surface, as depicted in FIGS. 28A and 28B and FIGS. 29A and 29B.

Figure 30B:
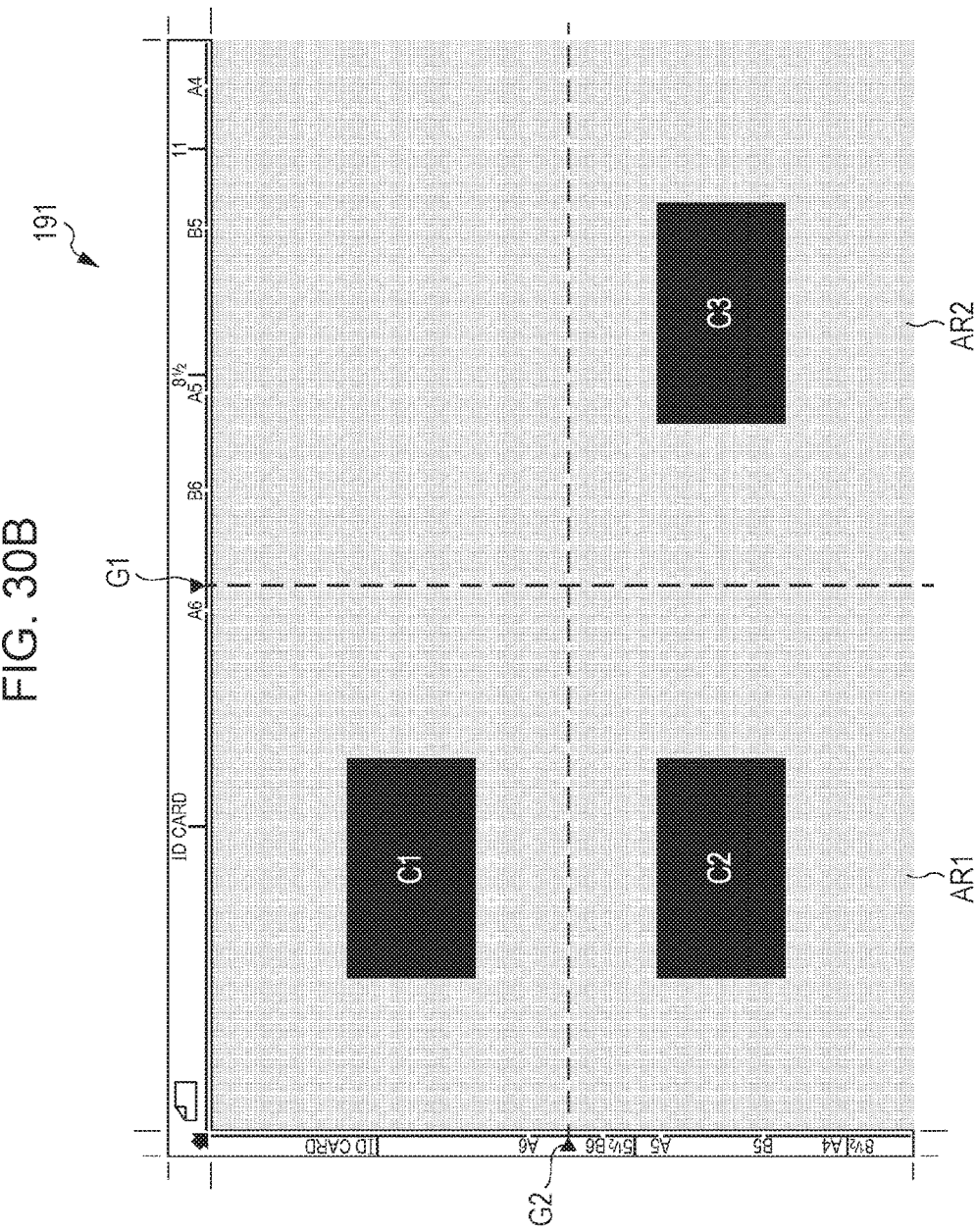

In addition, as depicted in FIGS. 30A and 30B, when the number of the cards C1 to C3 placed in the areas AR1 to AR4 is the same for the front surface and for the back surface but positions of the areas in which the cards C1 to C3 are placed are different for the front surface and for the back surface, the control unit 10 may cause the display operation unit 171 to display error information.

Figure 31A:
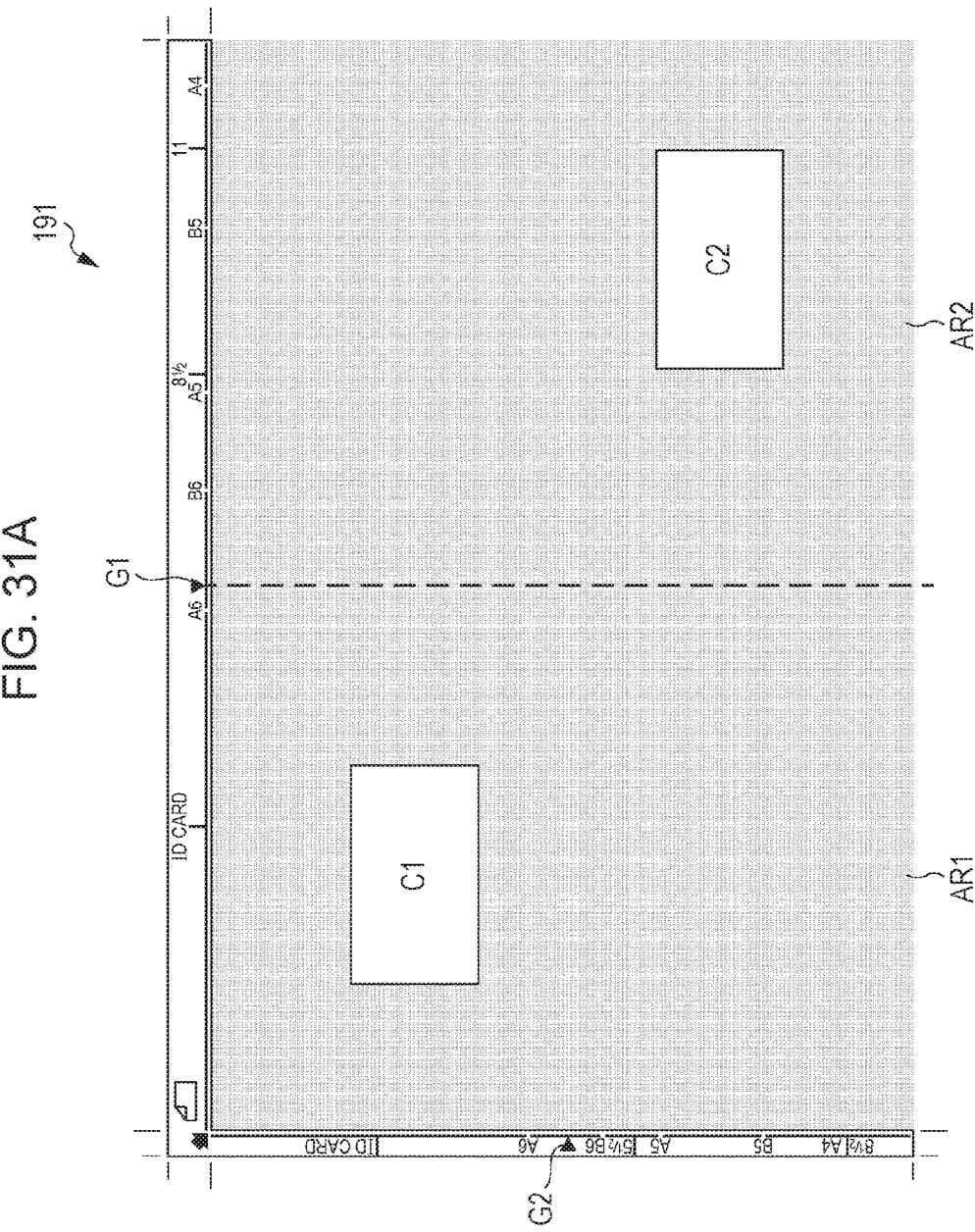
FIGS. 31A and 31B are illustrations depicting examples of improper card layout.
Figure 31B:
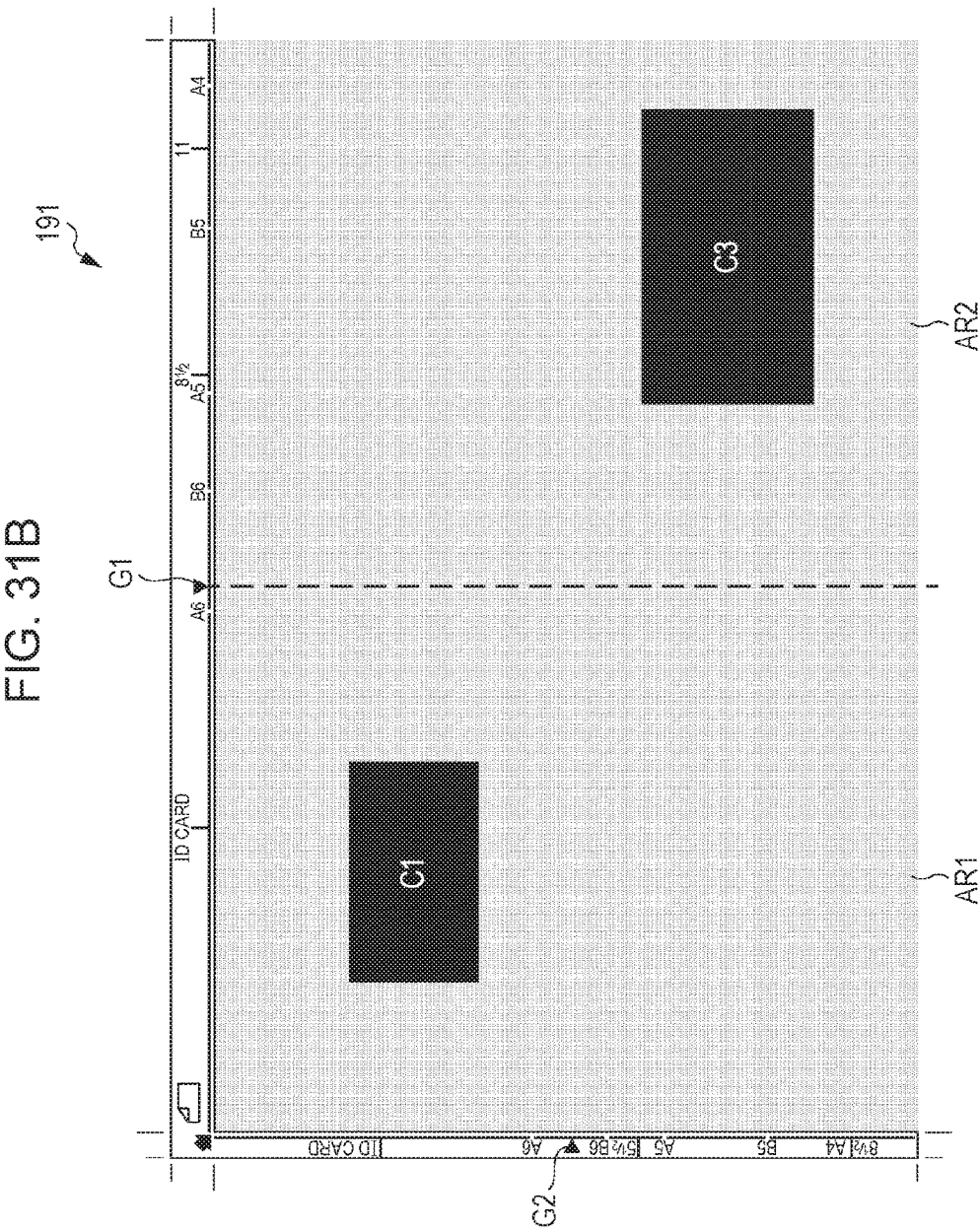

Further, as depicted in FIGS. 31A and 31B, when the cards are properly placed in the areas AR1 and AR2 but the sizes or shapes of the cards C2 and C3 placed in the same area AR2 are different for the front surface and for the back surface, the control unit 10 may cause the display operation unit 171 to display error information.

In this way, when the plurality of documents placed on the platen 191 are not properly arranged in the plurality of areas, the error information is displayed, and thus an image scanning device that enables the user to place a plurality of documents without a mistake at positions on the platen 191 with less restriction than in the related art and to scan the plurality of documents at a single time is realized.

Fourth Embodiment

Figure 32A:
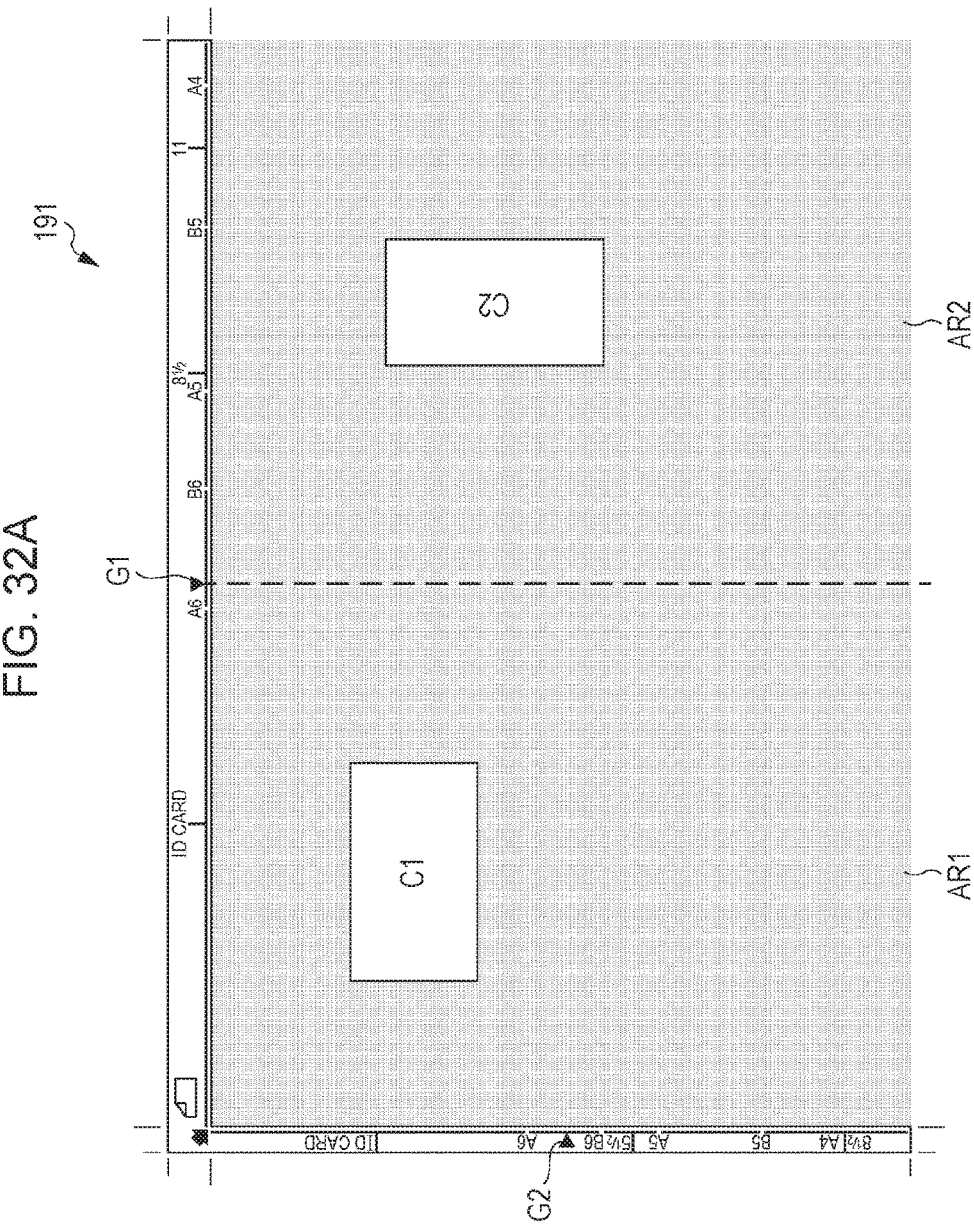
FIGS. 32A and 32B are illustrations depicting examples of card layout on the platen of the image scanning device according to a fourth embodiment.
Figure 32B:
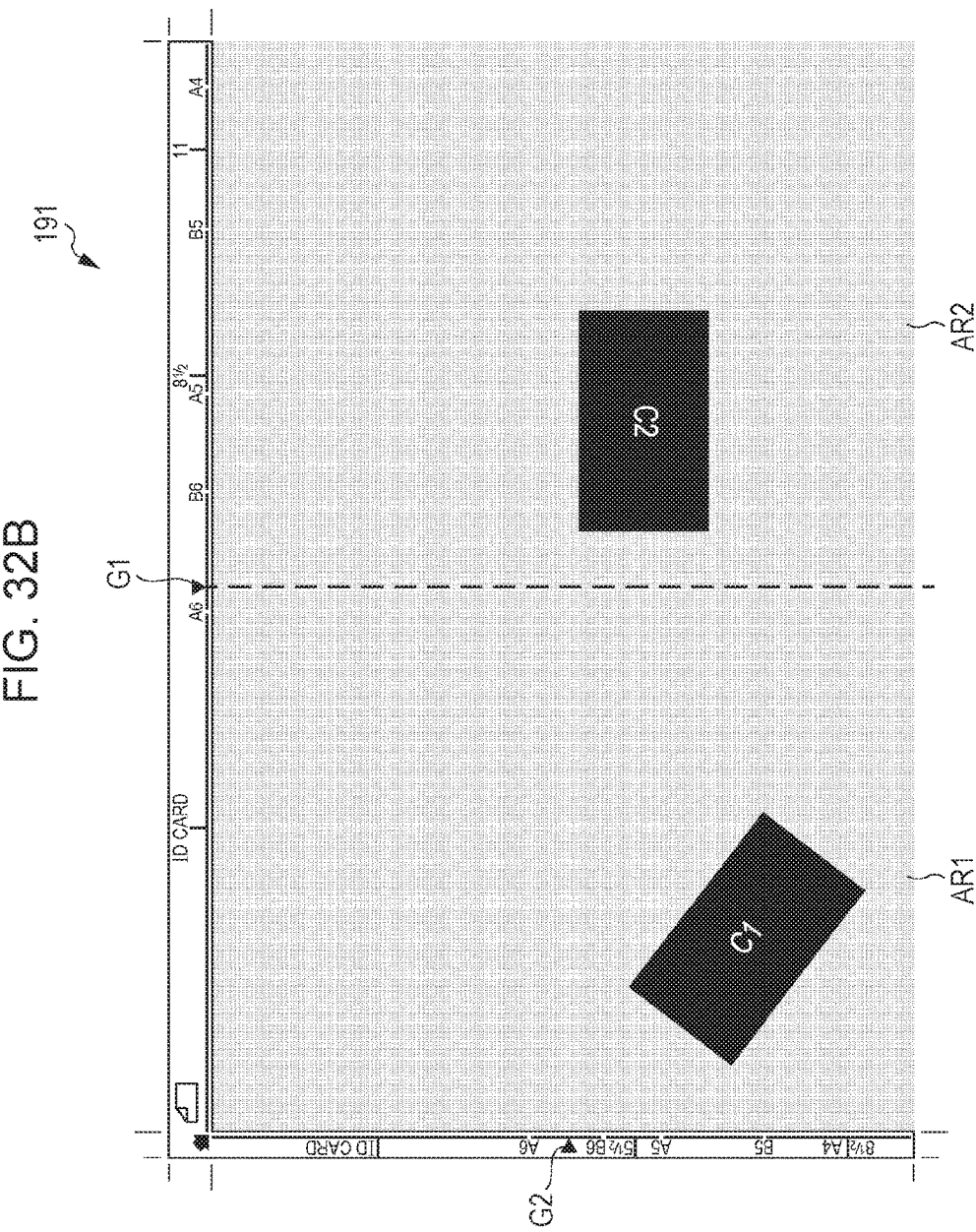

Next, referring to FIGS. 32A and 32B, the digital multifunction peripheral 1 according to a fourth embodiment of the present disclosure will be described. FIGS. 32A and 32B are illustrations depicting another example of card layout on the platen 191 of the digital multifunction peripheral 1 according to the fourth embodiment of the present disclosure. FIG. 32A depicts an example layout for scanning the back surfaces of the cards, and FIG. 32B depicts an example layout for scanning the front surfaces of the cards.

As depicted in FIGS. 32A and 32B, when the cards C1 and C2 are placed obliquely or upside down in the areas AR1 and AR2, respectively, image data may be automatically corrected so that the images of the cards C1 and C2 are oriented towards the right direction by detecting tilting angles of the cards C1 and C2 based on tilting angles of the edges of the cards, directions of characters printed on the cards, or the like.

In this way, a user may place cards in a plurality of areas without restriction, and thus it is possible to print the front and back surfaces of a plurality of cards more easily than in the related art.

Desirable embodiments of the present disclosure include combinations of some of the plurality of embodiments described above. Various modifications of the present disclosure, other than the embodiments described above, are possible. Those modifications are not to be considered to be outside the scope of the present disclosure. The present disclosure is to embrace all the modifications within the meaning of equivalency of the claims and within the scope of the claims.

The present disclosure contains subject matter related to that disclosed in Japanese Priority Patent Application JP 2017-117208 filed in the Japan Patent Office on Jun. 14, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image scanning device comprising:
a platen;
an image scanner that scans at a single time a plurality of documents placed on the platen and generates a plurality of pieces of image data; and
an image data processor that performs processing of the plurality of pieces of image data,
wherein, when the image scanner generates a plurality of pieces of first image data by scanning at a single time first surfaces of the plurality of documents, each of the plurality of documents being placed in one of a plurality of predetermined areas on the platen, and thereafter generates a plurality of pieces of second image data by scanning at a single time surfaces opposite to the first surfaces of the plurality of documents, each of the plurality of documents being turned over and placed again in the one of the plurality of predetermined areas, the image data processor associates one of the plurality of pieces of the first image data with a corresponding one of the plurality of pieces of the second image data for each of the plurality of predetermined areas, as pieces of image data of a front surface and a back surface.

2. The image scanning device according to claim 1, further comprising:
an area indicator having at least one mark that indicates positions of the plurality of predetermined areas.

3. The image scanning device according to claim 1, further comprising:
an output layout setter that sets a layout for outputting the plurality of pieces of image data,
wherein the image data processor associates the plurality of pieces of image data with each other in accordance with the layout that is set by the output layout setter.

4. The image scanning device according to claim 1, further comprising:
a display,
wherein the display displays at least one mark that indicates positions of the plurality of areas on the platen, the plurality of areas being predetermined in accordance with the number of the plurality of documents to be scanned at a single time, so that each of the plurality of documents is placed separately in one of the plurality of areas.

5. The image scanning device according to claim 4, wherein the at least one mark is a boundary line that divides the platen into the plurality of areas in accordance with the number of the plurality of documents to be scanned at a single time.

6. The image scanning device according to claim 4, wherein the at least one mark is an arrow, an indicating line, or another indicating symbol that indicates a position of a boundary between the plurality of areas in accordance with the number of the plurality of documents to be scanned at a single time.

7. The image scanning device according to claim 4, wherein the image scanner generates the plurality of pieces of the first image data, and thereafter the display displays a scan result of the plurality of pieces of the first image data.

8. The image scanning device according to claim 4, wherein the image scanner generates the plurality of pieces of the first image data, and thereafter the display displays an instruction to turn over and place each of the plurality of documents again in a corresponding one of the plurality of areas.

9. The image scanning device according to claim 8, wherein the instruction includes at least one of an animation and a message.

10. The image scanning device according to claim 4, further comprising:
an operator that receives an instruction from a user,
wherein, when the image scanner generates the plurality of pieces of the first image data and the plurality of pieces of the second image data, the display displays, in accordance with the number of the plurality of documents, a plurality of layouts in which the plurality of documents are arranged in rows and columns in accordance with predetermined arrays, and when the operator receives selection of one of the plurality of layouts, the output layout setter associates each of the plurality of pieces of the first image data with one of the plurality of pieces of the second image data in accordance with the selected one of the plurality of layouts.

11. The image scanning device according to claim 4, further comprising:
an image scanning determiner,
wherein, when the image scanning determiner determines that the plurality of documents are improperly arranged in the plurality of areas, the display displays error information.

12. An image processing apparatus comprising:
the image scanning device according to claim 4; wherein
the image data processor performs processing of the plurality of pieces of image data generated by the image scanning device and thereafter causes the display to display an image based on the plurality of pieces of image data.

13. An image scanning method comprising:
image scanning in which a plurality of documents placed on a platen are scanned at a single time and a plurality of pieces of image data are generated; and
image data processing in which the plurality of pieces of image data are processed,
wherein, in the image scanning, when a plurality of pieces of first image data are generated by scanning at a single time first surfaces of the plurality of documents, each of the plurality of documents being placed in one of a plurality of predetermined areas on the platen, and thereafter a plurality of pieces of second image data are generated by scanning at a single time surfaces opposite to the first surfaces of the plurality of documents, each of the plurality of documents being turned over and placed again in the one of the plurality of predetermined areas, in the image data processing, one of the plurality of pieces of the first image data is associated with a corresponding one of the plurality of pieces of the second image data for each of the plurality of predetermined areas, as pieces of image data of a front surface and a back surface.

14. A non-transitory computer-readable medium storing a program causing a processor of an image scanning device to execute a process, the process comprising:

image scanning in which a plurality of documents placed on a platen are scanned at a single time and a plurality of pieces of image data are generated; and image data processing in which the plurality of pieces of image data are processed, wherein, in the image scanning, when a plurality of pieces of first image data are generated by scanning at a single time first surfaces of the plurality of documents, each of the plurality of documents being placed in one of a plurality of predetermined areas on the platen, and thereafter a plurality of pieces of second image data are generated by scanning at a single time surfaces opposite to the first surfaces of the plurality of documents, each of the plurality of documents being turned over and placed again in the one of the plurality of predetermined areas, in the image data processing, one of the plurality of pieces of the first image data is associated with a corresponding one of the plurality of pieces of the second image data for each of the plurality of predetermined areas, as pieces of image data of a front surface and a back surface.

* * * * *